US012751429B2

(12) United States Patent
Cruz et al.

(10) Patent No.: US 12,751,429 B2
(45) Date of Patent: Oct. 6, 2026

(54) TOP-FILL HUMMINGBIRD FEEDER WITH FLOAT VALVE BASE CLOSURE MECHANISM

(71) Applicant: Woodstream Corporation, Lancaster, PA (US)

(72) Inventors: Robert T. Cruz, Lititz, PA (US); Marko Konstantin Lubic, Shillington, PA (US)

(73) Assignee: Woodstream Corporation, Lancaster, PA (US)

( * ) Notice: Subject to any disclaimer, the term of this patent is extended or adjusted under 35 U.S.C. 154(b) by 49 days.

(21) Appl. No.: 18/821,108

(22) Filed: Aug. 30, 2024

(65) Prior Publication Data

US 2024/0423169 A1 Dec. 26, 2024

Related U.S. Application Data

(60) Division of application No. 17/495,036, filed on Oct. 6, 2021, now Pat. No. 12,102,062, which is a continuation of application No. 16/127,492, filed on Sep. 11, 2018, now Pat. No. 11,147,245, which is a continuation of application No. 15/398,448, filed on Jan. 4, 2017, now Pat. No. 10,085,426, which is a continuation of application No. 14/516,224, filed on Oct. 16, 2014, now Pat. No. 9,549,537, which is a continuation of application No. 13/117,582, filed on May 27, 2011, now Pat. No. 8,869,743, which is a continuation-in-part of application No. 12/591,289, filed on Nov. 16, 2009, now abandoned.

(60) Provisional application No. 61/202,508, filed on Mar. 6, 2009.

(51) Int. Cl.

| | |
|---|---|
| ***A01K 39/02*** | (2006.01) |
| ***A01K 39/012*** | (2006.01) |
| ***A01K 39/024*** | (2006.01) |
| ***A01K 39/04*** | (2006.01) |

(52) U.S. Cl.
CPC ........ *A01K 39/0206* (2013.01); *A01K 39/012* (2013.01); *A01K 39/02* (2013.01); *A01K 39/024* (2013.01); *A01K 39/04* (2013.01)

(58) Field of Classification Search
CPC ...... A01K 39/04; A01K 39/024; A01K 39/02; A01K 39/012
See application file for complete search history.

(56) References Cited

U.S. PATENT DOCUMENTS

| | | | |
|---|---|---|---|
| 2,097,719 | A | 11/1937 | Brembeck |
| 4,224,900 | A | 9/1980 | Truhan |
| 7,600,487 | B2 | 10/2009 | Stone et al. |
| 7,685,969 | B2 | 3/2010 | Stone et al. |
| 7,743,732 | B2 | 6/2010 | Webber |
| 7,861,671 | B2 | 1/2011 | Carter et al. |
| 7,891,319 | B2 | 2/2011 | Stone et al. |
| 7,946,249 | B2 | 5/2011 | Colvin et al. |
| 8,011,323 | B2 | 9/2011 | Vaughn, Jr. et al. |

(Continued)

FOREIGN PATENT DOCUMENTS

| | | |
|---|---|---|
| GB | 2189870 A1 | 11/1987 |

*Primary Examiner* — Trinh T Nguyen
(74) *Attorney, Agent, or Firm* — Barley Snyder

(57) ABSTRACT

A top-fill hummingbird feeder includes a liquid container with a liquid opening at a lower end. A feeding basin is positioned below the liquid container for containing nectar accessed by birds. A sealing mechanism includes a valve responsive to a nectar level in the feeding basin for opening and closing the liquid opening.

15 Claims, 27 Drawing Sheets

(56) References Cited

U.S. PATENT DOCUMENTS

| | | | |
|---|---|---|---|
| 8,051,803 | B2 | 11/2011 | Gauker et al. |
| 8,291,862 | B2 | 10/2012 | Gauker et al. |
| 8,333,168 | B2 | 12/2012 | Vaughn, Jr. et al. |
| 8,869,743 | B2 | 10/2014 | Cruz et al. |
| 9,549,537 | B2 | 1/2017 | Cruz et al. |
| 10,085,426 | B2 | 10/2018 | Cruz et al. |
| 11,147,245 | B2 | 10/2021 | Cruz et al. |
| 2003/0226514 | A1 | 12/2003 | Cote |
| 2007/0028540 | A1 | 2/2007 | Bloom |
| 2008/0251025 | A1 | 10/2008 | Guay et al. |
| 2008/0257273 | A1 | 10/2008 | Carter et al. |
| 2009/0320765 | A1 | 12/2009 | Gauker et al. |
| 2010/0132618 | A1 | 6/2010 | Stone et al. |
| 2010/0229801 | A1 | 9/2010 | Stone et al. |
| 2010/0242848 | A1 | 9/2010 | Vaughn, Jr. et al. |
| 2011/0100300 | A1 | 5/2011 | Carter et al. |
| 2011/0209666 | A1 | 9/2011 | Stone et al. |
| 2012/0132145 | A1 | 5/2012 | Gauker et al. |

TOP-FILL HUMMINGBIRD FEEDER WITH FLOAT VALVE BASE CLOSURE MECHANISM

CROSS-REFERENCE TO RELATED APPLICATIONS

This application is a divisional application of U.S. application Ser. No. 17/495,036 filed on Oct. 6, 2021 which is a continuation of co-pending U.S. application Ser. No. 16/127,492, filed Sep. 11, 2018, which is a continuation of U.S. application Ser. No. 15/398,448 filed Jan. 4, 2017, issuing as U.S. Pat. No. 10,085,426 on Oct. 2, 2018, which is a continuation of U.S. application Ser. No. 14/516,224 filed Oct. 16, 2014, issuing as U.S. Pat. No. 9,549,537 on Jan. 24, 2017, which is a continuation of U.S. application Ser. No. 13/117,582 filed May 27, 2011, issuing as U.S. Pat. No. 8,869,743 on Oct. 28, 2014, which was a continuation-in-part application of U.S. application Ser. No. 12/591,289, filed Nov. 16, 2009, which claimed priority from U.S. Provisional Application No. 61/202,508 filed Mar. 6, 2009, and hereby claims the priority thereof to which it is entitled.

FIELD OF THE INVENTION

The present invention is related to the field of bird feeders and, more particularly, to top-fill hummingbird feeders.

BACKGROUND

People who live in an area inhabited by hummingbirds frequently try to promote their presence by the use of hummingbird feeders. Hummingbird feeders differ from ordinary bird feeders because hummingbirds feed on nectar or simulated nectar, which are liquid, instead of the dry food consumed by most birds. Simulated nectar is typically formed from water sweetened with sugar or honey. In many hummingbird feeders, the nectar (or simulated nectar) is stored in a reservoir and conveyed to simulated flowers where a perch may be provided so that the hummingbird can land and, having a long, slender beak, insert it into the access apertures in the simulated flower and feed.

Most hummingbird feeders have one of two basic designs. One includes an inverted top container which empties into a lower reservoir or feeding basin from which the birds feed. The vacuum at the top of the container (or put another way, the outside air pressure) keeps the liquid in the top container from draining out too rapidly. The other common feeder design consists of a container with holes in its cover through which the hummingbirds reach to feed. This latter style of feeder suffers from the problem that it must be refilled very often, because the level of food is constantly being reduced by the feeding.

The so-called "vacuum-type" feeders also have problems. For example, they can only be filled by dismantling the feeder and removing the top container from its feeding position. Ordinarily, the consumer must invert the feeder in order to refill it, with the attendant risks of spillage, and requires a certain amount of manual dexterity to create the necessary vacuum. Moreover, because a vacuum is required, these designs are limited to a single opening for filling and cleaning. This opening is typically small, which restricts access to the interior of the container and makes it more difficult to effectively clean the container. Additionally, vacuum feeders can corrode or be inefficient, permitting the nectar to leak and creating an increased risk of insect contamination.

One product which has been available in the market is the Garden Song Top Fill Hummingbird Feeder from Opus Incorporated. The Opus feeder includes an upstanding liquid container with a large top opening and a small cylindrical lower opening which is screw-threaded into an upstanding cylindrical collar positioned in the center of a feeding basin or liquid tray. The top opening is closed with a cover that seals the container to create a vacuum as the liquid level recedes downwardly in the container. An internal, rotatable ring or valve mechanism has an upstanding cylindrical wall which surrounds the cylindrical collar inside the feeding basin.

The wall of the cylindrical collar has a plurality of ports, and the cylindrical wall of the rotatable ring has a plurality of corresponding openings. When the openings in the rotatable ring are aligned with the ports of the collar using an externally accessible lever, nectar can flow out of the container lower opening, through the aligned ports and openings, and into the feeding basin or liquid tray. When the rotatable ring is rotated using the externally accessible lever, so that its openings are not aligned with the ports of the collar, the nectar flow from the container to the feeding basin is cut off. In this condition, the cover can be removed from the container top opening for (re)filling the container without nectar in the container flowing out through the collar to flood and overflow the feeding basin or liquid tray. This design also permits the top opening to be large enough to facilitate easy cleaning of the bottle.

There have also been modular designs for hummingbird feeders in which a common functional feeding module is utilized in conjunction with changeable decorative outer claddings. However, such prior art hummingbird modular feeders suffer the same drawbacks as discussed above.

SUMMARY

The present invention is directed to a hummingbird feeder which includes a generally upstanding reservoir bottle or liquid container containing a column of nectar and having a large opening at its top end. A removable top or cap is screw-threaded onto the top end to close and cover the top end opening. The top is vented to prevent a vacuum condition and allow atmospheric pressure to act on the column of nectar. The bottom of the bottle or container has a lower bottom opening, preferably in the form of a bottleneck-shaped cylindrical extension with external threads that can be screw-threaded into an upstanding well of a feeding basin that has a plurality of feeding ports in a known arrangement. A generally cylindrical float valve positioned in the feeding basin well and floating in the liquid nectar acts to close the bottleneck central opening when the feeding basin is filled with liquid nectar to the prescribed level. When the level of liquid nectar drops, the vertical height of the float valve within the basin is also lowered which allows fluid from the container to flow through the bottleneck opening to refill the basin.

According to a first embodiment, the wall forming the cylindrical extension of the bottleneck converges radially to form a conical closure having a sloped outer surface. A small opening at the apex of the conical closure allows nectar to flow from the liquid container into the feeding basin when the float valve, which has a central portion configured to engage the conical closure in a first position, is spaced away from the sloped outer surface in a second position.

According to a second embodiment, the free or lower end of the bottleneck extension is provided with a seal plate having a small central opening with conically tapered side walls. The float valve has a complementarily tapered truncated conical projection that plugs the central opening when the valve rises to an upper position.

In a third embodiment, the cylindrical well is provided a flat sealing edge portion that surrounds a hollow center portion having an inverted truncated conical shape with sloped sides. Contained and vertically movable within the center portion is a plug that fits in scaling engagement with the sloped sides. The plug is mounted on a post which initiates vertical movement of the plug in response to a lever arm coupled at a first end to the post and at a second end to a float. When the float is in a low position, the lever arm exerts sufficient force on the post and the plug to lift them upwardly to open the hollow center portion of the well so that nectar can flow into the feeding basin. As the float rises, and with it the second of the lever arm, the post and plug are allowed to move downwardly in response to liquid pressure in the container to seal the hollow center portion.

In a fourth embodiment which is similar to the third embodiment, the well has a sealing plate with a generally cylindrical central hole. The plug has a post portion that is vertically movable within the hole, and an enlarged head that seals the hole when the plug is in its lowered position. As with the third embodiment, movement of the plug to open the hole is initiated by a float and lever mechanism responsive to nectar level in the feeding basin.

According to a fifth embodiment, the free or lower end of the bottleneck extension is provided with a seal plate having a central opening and a downwardly projecting nozzle positioned under the seal plate. The nozzle has a liquid flow channel that extends from the nozzle tip to the central opening in the seal plate. When the float valve is in a lower position, liquid flows from the container through the channel and into the feeding basin. When the float rises to an upper position, a float seal on the float valve engages the nozzle tip to seal off the liquid flow channel.

In view of the foregoing, it is an object of the present invention to provide a reliable, consumer-friendly hummingbird feeder having a liquid-holding container or bottle with a large open top for easy top filling and cleaning of the container.

Another object of the present invention is to provide a hummingbird feeder in which the liquid-holding container or bottle does not have to be inverted after filling and which does not rely on a vacuum condition in the liquid-holding container or bottle to control the flow the nectar into the feeding basin.

A further object of the present invention is to provide a hummingbird feeder with a liquid-holding container or bottle having a bottleneck-shaped lower end with an opening that is received within an upstanding cylindrical well on the feeding basin and opened and closed by a sealing or valve mechanism in the form of a float valve positioned in the well.

A still further object of the present invention is to provide a hummingbird feeder in accordance with the preceding objects and one embodiment, in which the bottleneck-shaped lower end of the container is provided with a bottom having a cone-shaped surface and/or opening, preferably located centrally therein, to mate with a cone-shaped surface and/or projection on the upper surface of the float valve that closes the opening when the liquid nectar in the feeding basin reaches a prescribed level.

An additional object of the present invention is to provide a hummingbird feeder in accordance with the preceding objects, in which a centering mechanism within the upstanding basin well keeps the float valve aligned with the opening in the bottom surface of the container lower end.

Yet another object of the present invention is to provide a hummingbird feeder generally in accordance with the preceding objects and another embodiment in which the bottleneck-shaped lower end of the container is provided with a bottom opening that is closed by a plug that is vertically moved by a lever arm and float mechanism coupled to the plug and responsive to nectar level in the feeding basin.

A further object of the present invention is to provide a hummingbird feeder generally in accordance with the preceding objects and another embodiment in which the bottleneck-shaped lower end of the container is provided with a seal plate and a downwardly projecting nozzle with a liquid flow channel, and the float has a float seal that engages the nozzle tip to seal off the liquid flow channel when the float is in an upper position.

Still another object of the present invention is to provide a hummingbird feeder in accordance with the preceding objects, which has components that can be easily manufactured from readily available and known materials and that can be easily assembled for ease and economy of manufacture and easily disassembled and reassembled for easy cleaning and which will be sturdy and long lasting in operation and use.

These and other objects of the invention, as well as many of the intended advantages thereof, will become more readily apparent when reference is made to the following description taken in conjunction with the accompanying drawings.

BRIEF DESCRIPTION OF THE DRAWINGS

The invention will now be described by way of example with reference to the accompanying Figures, of which.

DETAILED DESCRIPTION OF THE EMBODIMENTS

Figure 1:
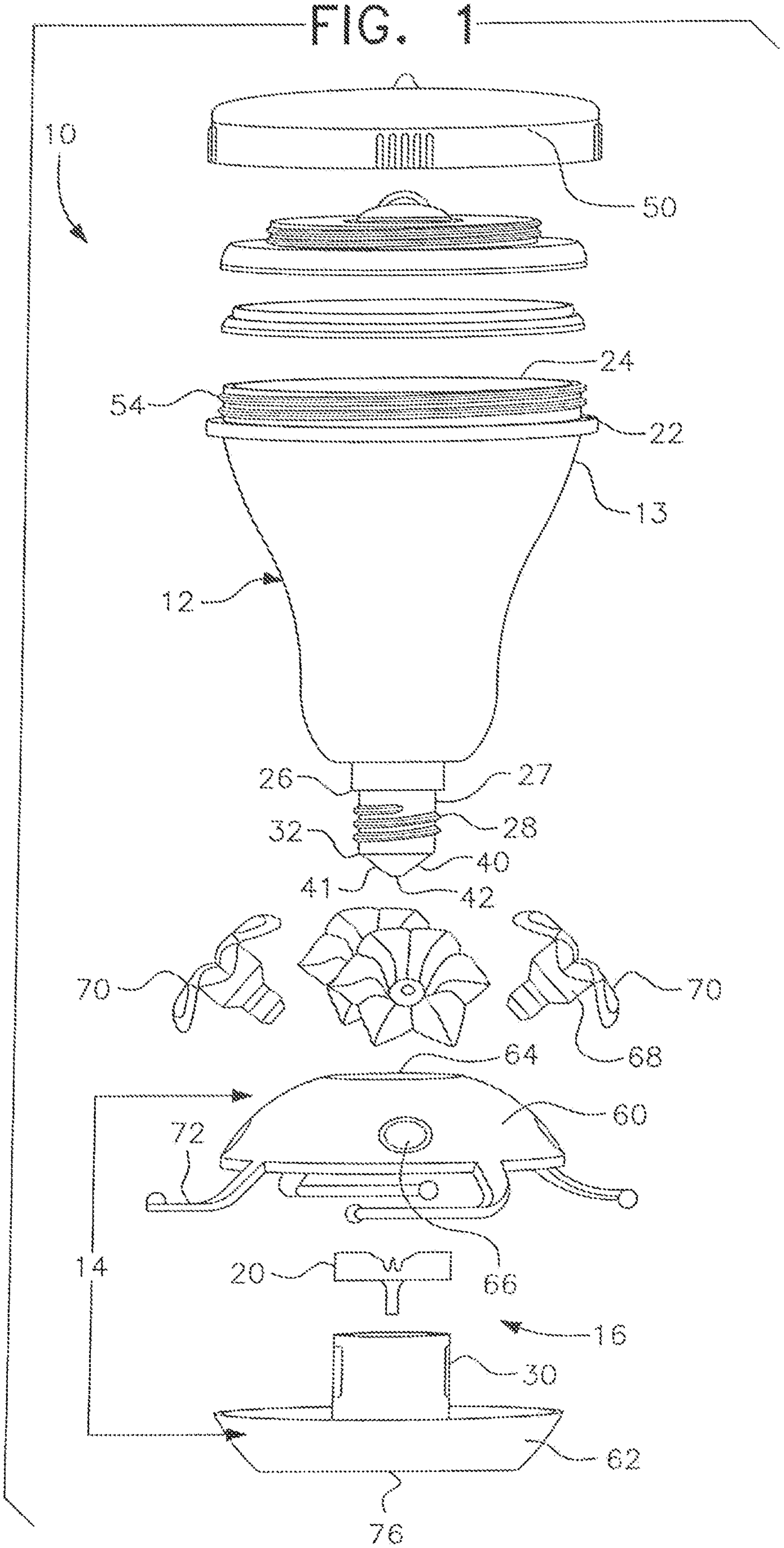
FIG. 1 is an exploded side view of the components of a top-fill hummingbird feeder in accordance with a first embodiment of the present invention.

Five preferred embodiments of the invention are explained in detail herein. However, it is to be understood that the embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

As shown in FIG. 1, a top-fill hummingbird feeder in accordance with a first embodiment of the present invention is generally designated by reference numeral 10. The feeder consists of a reservoir bottle or liquid container generally designated by reference numeral 12, a feeding basin generally designated by reference numeral 14, and a sealing or valve mechanism generally designated by reference numeral 16. As shown in the enlarged view of FIG. 2, the sealing or valve mechanism 16 includes a float valve 20 configured for engagement with the lower end of the liquid container 12.

Figure 2:
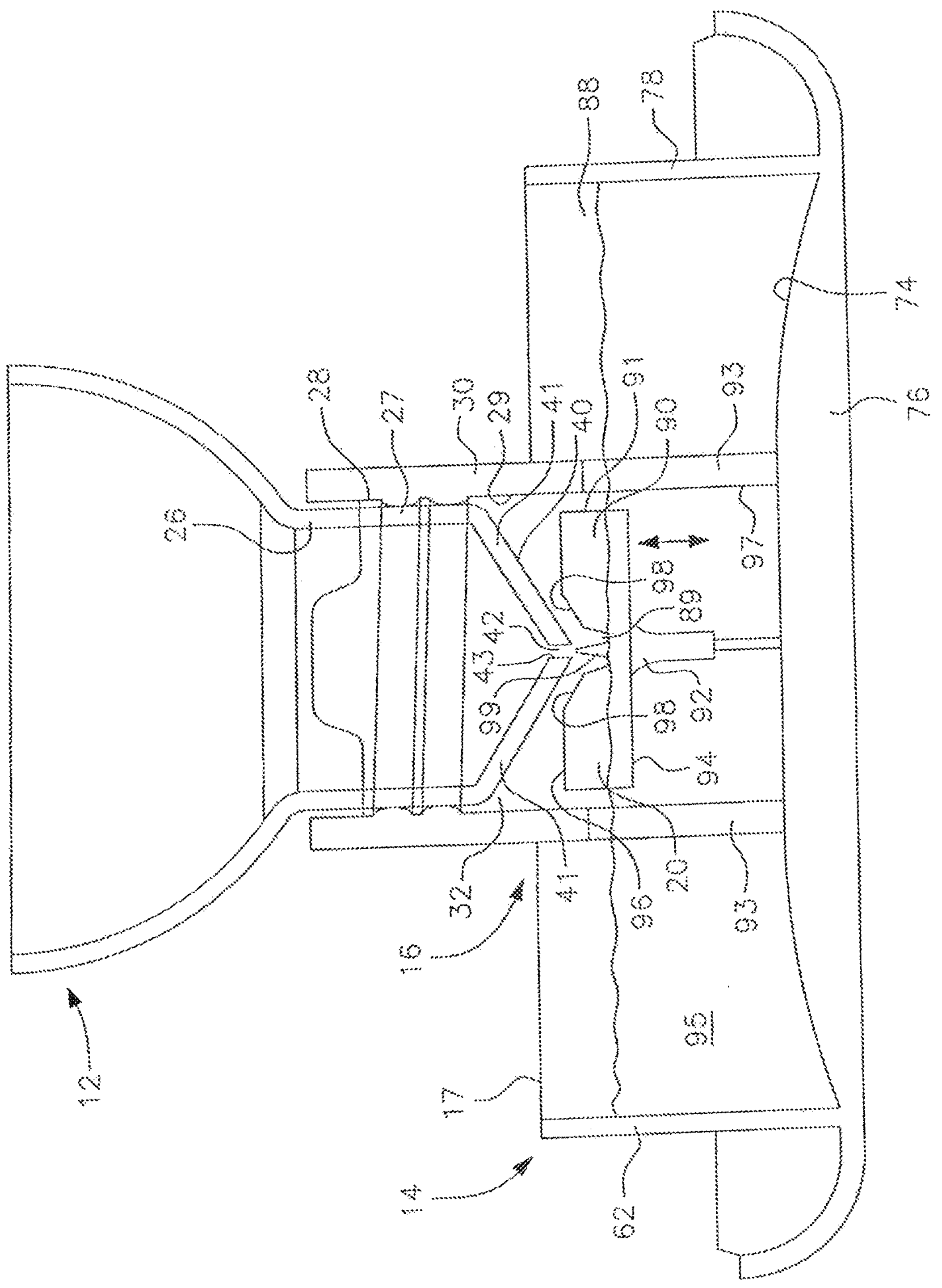
FIG. 2 is an enlarged sectional side view of the feeding basin, sealing mechanism and lower end of the liquid container of the feeder shown in FIG. 1.

The liquid container 12 has an upstanding neck 22 forming a large opening 24 at its upper end 13 for easy filling and cleaning of the liquid container. The bottom of the liquid container forms a generally cylindrical bottleneck-shaped extension 26 with external threads 28 so that it can be screw-threaded into the mating threads of a cylindrical wall 29 of an upwardly extending cylindrical well 30 of the feeding basin 14. At the free end 32 of the bottleneck extension 26, the cylindrical wall 27 forming the bottleneck converges radially to form a sealing wall or closure 40 having a sloped outer surface 41. At the apex of the conical closure 40 is a small central opening 42. The diameter of the central opening 42 is much smaller than the diameter of the bottleneck, as shown in FIG. 2, and preferably includes a downwardly tapering conical side wall 43.

A removable top or cap 50, secured in place such as by threads 54 that mate with corresponding threads (not shown) inside the cap, closes off the large opening 24 at the upper end 13 of the liquid container 12 when the cap is tightened. The cap 50 is vented to prevent a vacuum condition and to allow atmospheric pressure to act on the column of nectar being fed into the feeding basin from the container.

Preferably, the feeding basin 14 is generally circular in plan view and may be made in two parts including a cover 60 and a base 62 molded of suitable polymer material. When the feeder is assembled, the cover 60 and the base 62 are sealingly coupled to one another in any manner suitable for sealingly joining plastic parts, such as by a threaded engagement, adhesive, or other known connecting mechanism, to form the basin 14.

The basin cover 60 has a central opening 64 through which the bottleneck extension 26 of the container extends. The cover is also molded to include a plurality of openings 66 spaced around a periphery thereof for receiving feeding ports 68. The feeding ports 68 preferably include an ornamental part 70 to enhance the overall appearance of the feeder and increase its attractiveness to the hummingbirds. In the preferred embodiment shown in FIG. 1, the ornamental part 70 resembles flower petals. The cover is also preferably formed with perches 72 to support the hummingbirds when feeding.

The upwardly extending cylindrical well 30 is preferably integrally molded with the basin base 62, but it can be formed separately and then attached to the bottom inner surface 74 of the base in any manner known by persons of ordinary skill in the art to be suitable for sealingly joining plastic parts.

The base 62 includes a bottom 76 and a curved, upwardly directed base wall 78 that define a fluid holding area 88 of the base. The upwardly extending cylindrical well 30 is preferably centrally positioned with respect to the bottom 76 and projects above the upper wall 17 of the basin 14. The wall 29 of the cylindrical well 30 has slots 93 at its lower edge which allow liquid nectar in the fluid holding area 88 to move freely in and out of the well.

As shown in FIG. 2, the scaling or valve mechanism 16 includes a float valve 20 positioned inside the upwardly extending well 30. The float valve 20 has a float 90 and a spacing member 92. The periphery 91 of the float 90 conforms with, but is spaced slightly away from, the inner wall 97 of the well 30, thus centering the float valve 20 in the well 30. Hence, with the float 90 floating on the surface of the liquid nectar 95, the float valve 20 can move up and down with the level of the liquid nectar in the basin 14. The spacing member 92 keeps the float valve 20 spaced at a minimum vertical distance or height above the bottom 74 of the basin base 62, regardless of the nectar level.

Preferably, the float 90 is generally cylindrical or disc-shaped to conform with the wall 29 of the cylindrical well 30. In its preferred embodiment, the float 90 has a substantially flat bottom surface 94 that is coupled to or integral with the spacing member 92. The upper surface 96 of the float has a central portion 98 that slopes downwardly toward the center of the float 90 at an angle that substantially complements the sloped surface 41 of the conical closure 40 on the bottleneck 26 of the liquid container. At the bottom of the sloped central portion 98 of the float upper surface 96, an annular channel 89 is formed that surrounds an upwardly extending, tapered projection 99.

When the feeding basin 14 is full, the level of the nectar 95 raises the float valve 20 to bring it into abutment with the sloped surface 41 of the closure 40 of the bottleneck. In this position, the tapered projection 99 is received within and closes the central opening 42 in the closure 40, preventing further nectar in the container 12 from flowing into the basin. As the feeder is thereafter used by feeding birds, the level of nectar 95 in the basin 14 will drop. Since the float valve 20 rises and falls with the nectar level, the lowering of the nectar 95 creates a space between the surface 41 of the closure 40 and the upper surface 96 of the float 90, once again allowing liquid to flow from the container 12 into the basin 14 through the opening 42 until the basin is again filled so as to bring the upper surface 96 of the float 90 into abutment with the sloped surface 41 of the closure 40. In this way, the feeder basin is continually refilled by the quantity of liquid in the container.

To assemble the feeder from an empty state, the bottleneck portion 26 of the liquid container 12 is screwed into the internal threads 28 on the wall 29 of the cylindrical well 30, bringing the closure 40 to a position near, but spaced above, the sloped portion of the float 90. The liquid container is then filled through the open top thereof. As liquid nectar 95 enters the container 12, the nectar is permitted to flow into the fluid holding area 88 of the feeder basin 14 through the central opening 42 in the closure 40 and the slots 93 in the well 30. As the basin fills up, the float valve 20 rises with the liquid level in the basin until the sloped surfaces 41, 98 of the closure and the float are in abutment and the projection 99 on the float is fully inserted within the closure central opening 42. In this position, the opening 42 is closed by the projection 99 and the abutment of the sloped surfaces 98, 41 on the upper surface 96 of the float 90 with the lower surface of the closure 40. The flow of liquid nectar into the basin is thus stopped and the remainder of the container can be filled as desired. Thereafter, the container can be topped off and/or refilled at any time, as needed, by opening the top thereof and adding additional liquid. The upward pressure of the float valve 20 against the closure 40 once the basin is full keeps too much liquid from entering the basin and overflowing therefrom.

To disassemble the feeder for cleaning, the steps taken to assemble the feeder are reversed. The container 12 is unscrewed from the well 30 of the basin 14 and both parts can then be washed in water, preferably with warm soapy water, and then rinsed. Reassembly is then accomplished as described above.

As already noted, the sealing of the closure opening 42 when the basin 14 is full allows the container 12 to be refilled through the top opening without allowing fluid in the basin to escape through the feed ports 66. This configuration greatly increases convenience to the user as compared with hummingbird feeders that have to be inverted for filling in that inversion-fill feeders cannot be "topped off" without losing all of the liquid nectar still in the base since the entire feeder must be turned upside down to fill the reservoir and replace the base.

A float valve style hummingbird feeder in accordance with a second embodiment of the present invention is shown in FIGS. 3-6 and is generally designated by reference numeral 100. The feeder consists of a reservoir bottle or liquid container generally designated by reference numeral 112, a feeding basin generally designated by reference numeral 114, and a scaling mechanism generally designated by reference numeral 116 that includes a float valve 120 and a seal plate 122 configured for engagement with the lower end 132 of the liquid container 112.

A removable top or cap 150, secured in place such as by threads 154 that mate with corresponding threads 155 inside the cap, closes off the large opening 156 at the upper end of the liquid container 112 when the cap is tightened. The cap 150 is vented to prevent a vacuum condition and allow atmospheric pressure to act on the column of nectar being fed into the feeding basin from the container in the same manner as in the first embodiment.

Figure 3:
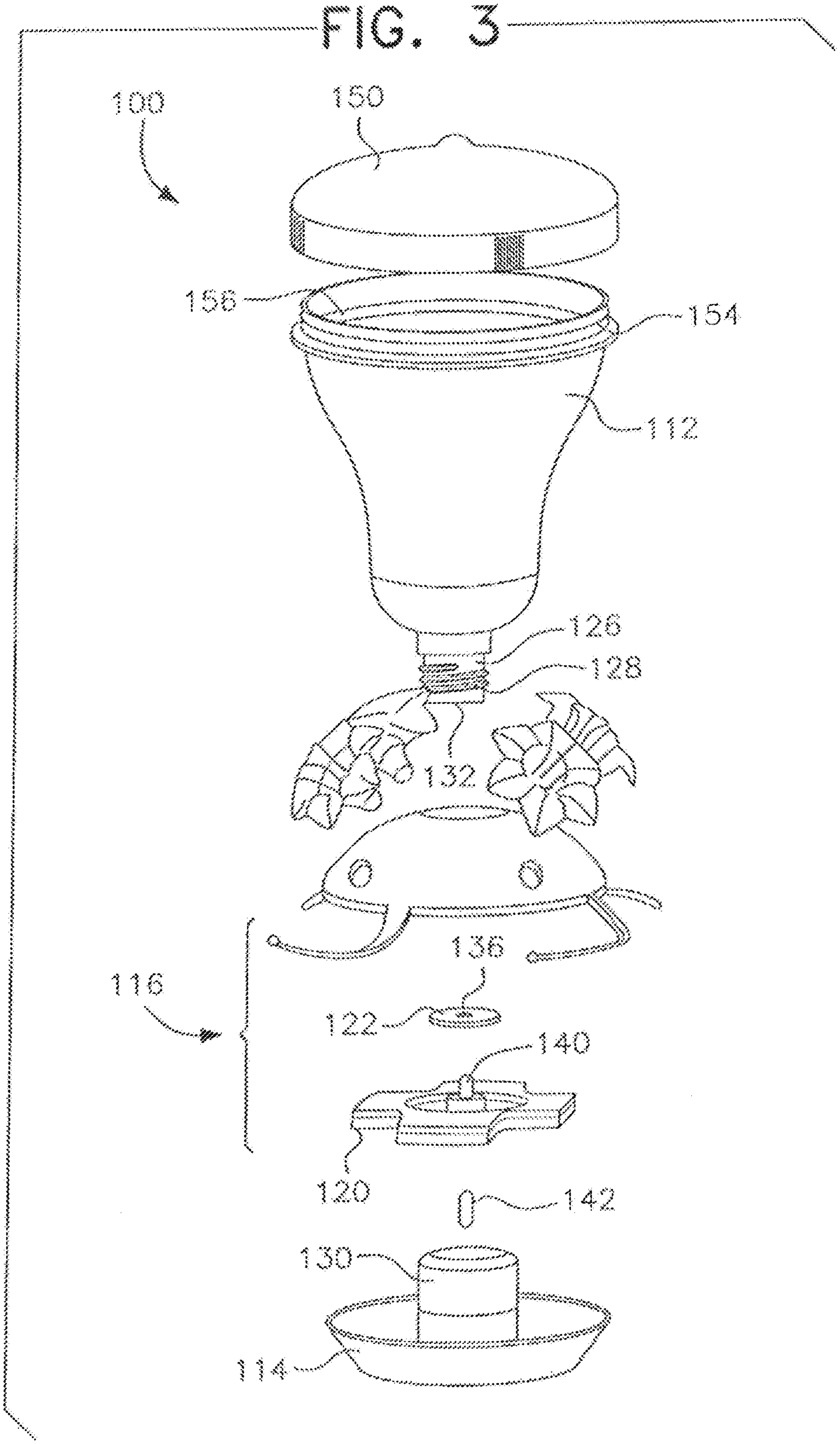
FIG. 3 is an exploded side perspective view of the components of a top-fill hummingbird feeder in accordance with a second embodiment of the present invention.
Figure 3A:
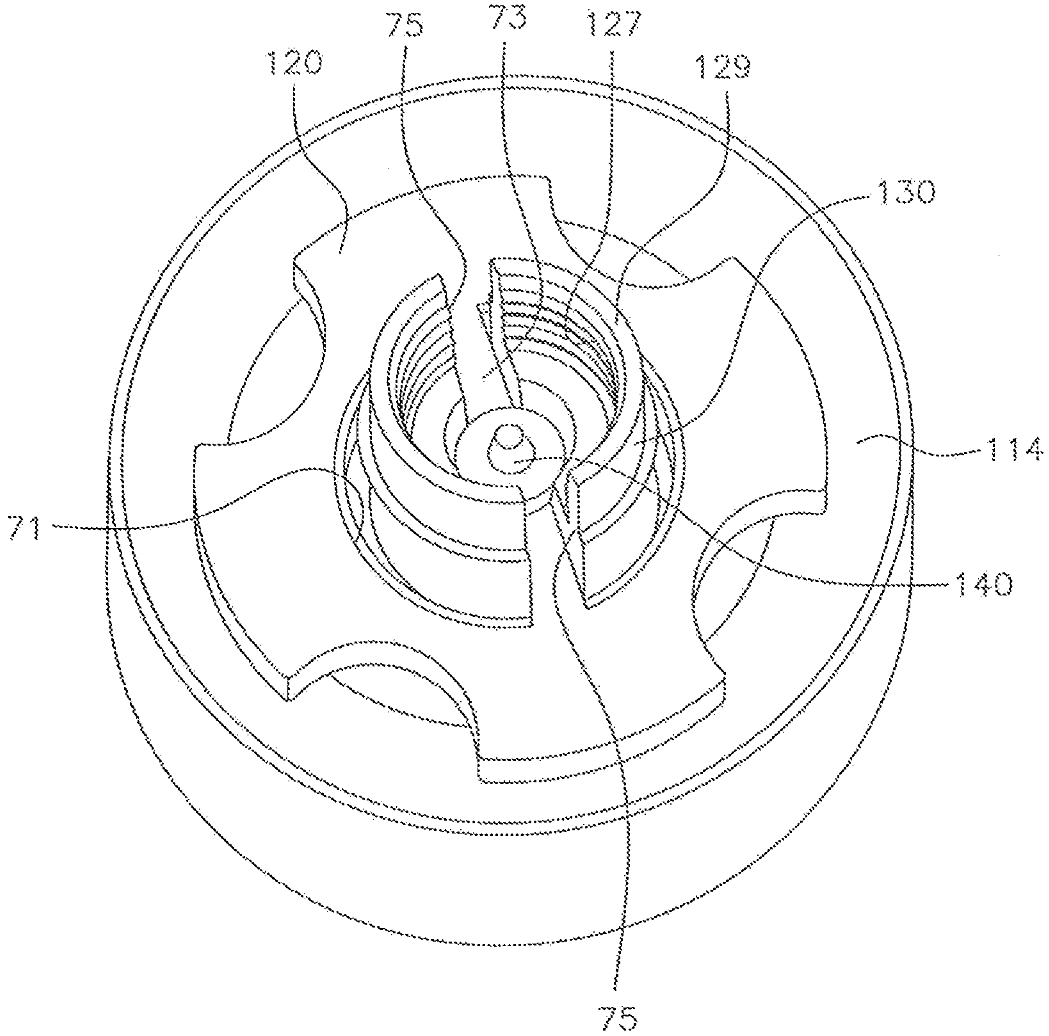
FIG. 3A is a perspective view of the float valve as mounted in the cylindrical well of the feeder shown in FIG. 3.
Figure 4:
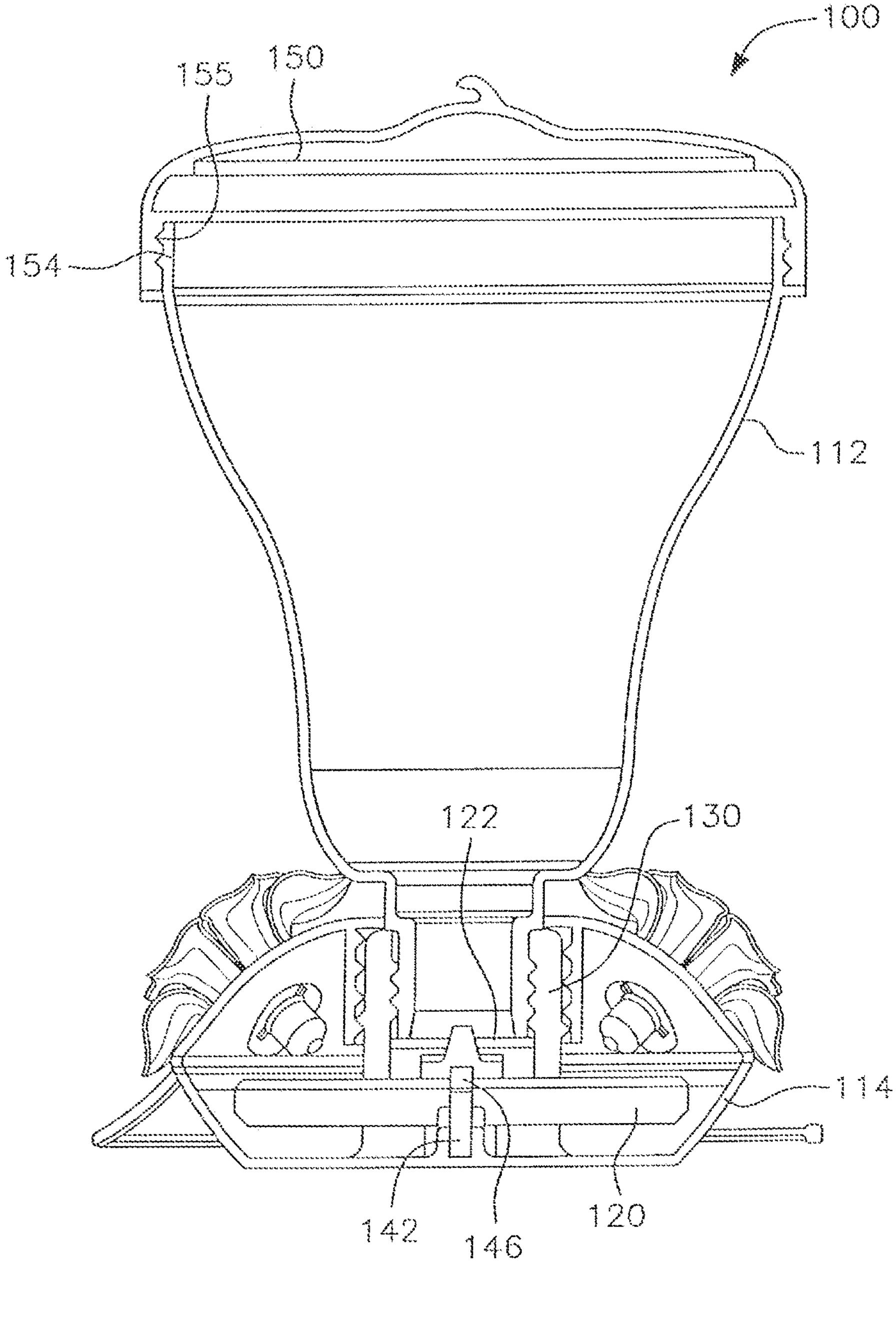
FIG. 4 is a sectional assembled side view of the feeder shown in FIG. 3.

The bottom of the liquid container 112 forms a generally cylindrical bottleneck-shaped extension 126 with external threads 128 so that it can be screw-threaded into the mating threads 127 of a wall 129 of an upwardly extending cylindrical well 130 of the feeding basin 114, shown in FIG. 3A. The bottleneck extension 126 has an open lower end 132, which is partially closed by the seal plate 122 when the bottleneck extension 126 is screw-threaded into the cylindrical well 130 and its lower end 132 engages the periphery of the seal plate 122. The seal plate 122 is preferably made of any soft elastomer, rubber or other flexible sealing material such as urethane, etc.

According to the second embodiment, the float valve 120 has a central opening 71 through which the well 130 extends. The central opening 71 is spanned across its diameter by a bridge 73 having a truncated conical projection 140 positioned in a center thereof. The wall 129 of the well 130 is split to form opposing channels 75 that receive the bridge 73 as shown in FIG. 3A.

Figure 5:
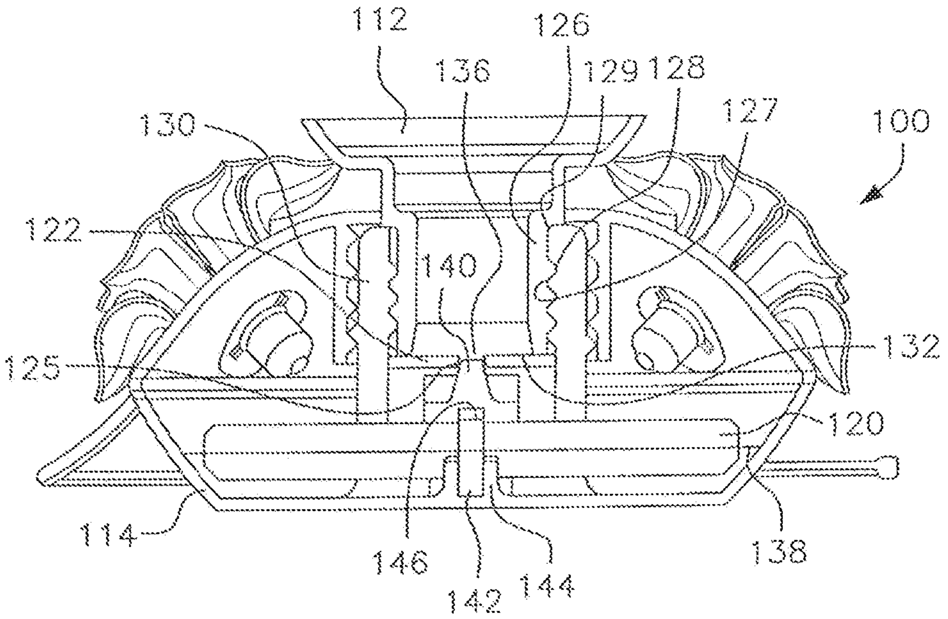
FIG. 5 is an enlarged sectional side view of the feeding basin, sealing mechanism and lower end of the liquid container of the feeder shown in FIG. 3, depicted in the open position.

The seal plate 122 has a central aperture 136 through which nectar in the container 112 flows to fill the feeding basin 114 when the float valve 120 is in the open position shown in FIG. 5. The aperture 136 preferably has a conical side wall tapering downwardly to complement the shape of the tapered truncated conical projection 140. The open position is obtained when the level 138 of the nectar in the feeding basin is low and the float valve 120, floating in the nectar, is also low so that the projection 140 is spaced away from the opening 136 in the seal plate 122 to form a flow channel 125. As nectar flows into the feeding basin 114, however, the level of the nectar and, in turn, the vertical position of the float valve 120 and the projection 140 on the bridge 73 thereof, rises until the float valve reaches its upper position at which point the feeding basin is "full".

Figure 6:
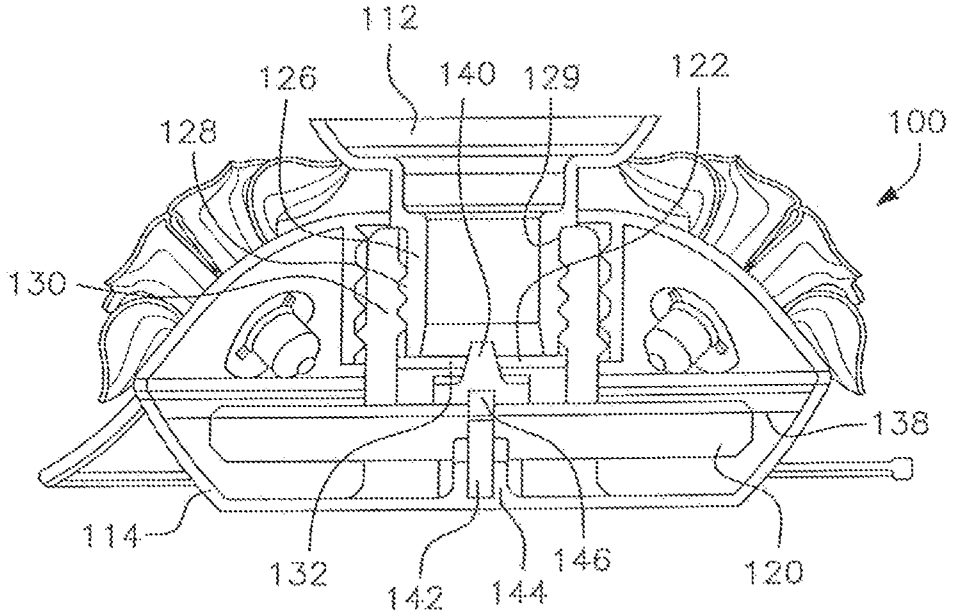
FIG. 6 is an enlarged sectional side view of the feeding basin, sealing mechanism and lower end of the liquid container of the feeder shown in FIG. 3, depicted in the closed position.

In the "full" position shown in FIG. 6, the upwardly directed projection 140 with the truncated conical shape extending from the center of the bridge 73 of the float valve 120 is received within the central aperture 136 in the seal plate 122. The projection 140 thereby closes or plugs the aperture 136 to prevent further flow of nectar from the container 112 into the feeding basin through the flow channel 125.

An upstanding guide pin 142 is preferably positioned centrally in a protrusion 144 at the base of the feeding basin 114 directly below the well 130. The pin 142 is received within a bore 146 formed in the center of the float valve 120 in order to laterally align the projection 140 with respect to the aperture 136 during upward and downward movement of the float valve 120.

A float valve style hummingbird feeder in accordance with a third embodiment of the present invention is shown in FIGS. 7-10 and is generally designated by reference numeral 200. The feeder consists of a reservoir bottle or liquid container generally designated by reference numeral 212, a feeding basin generally designated by reference numeral 214, and a sealing or valve mechanism generally designated by reference numeral 216. The liquid container has a large opening at its upper end that is closed by a removable cap in the same manner as in the second embodiment and with corresponding reference numerals, and therefore a discussion thereof will not be repeated here.

Figure 7:
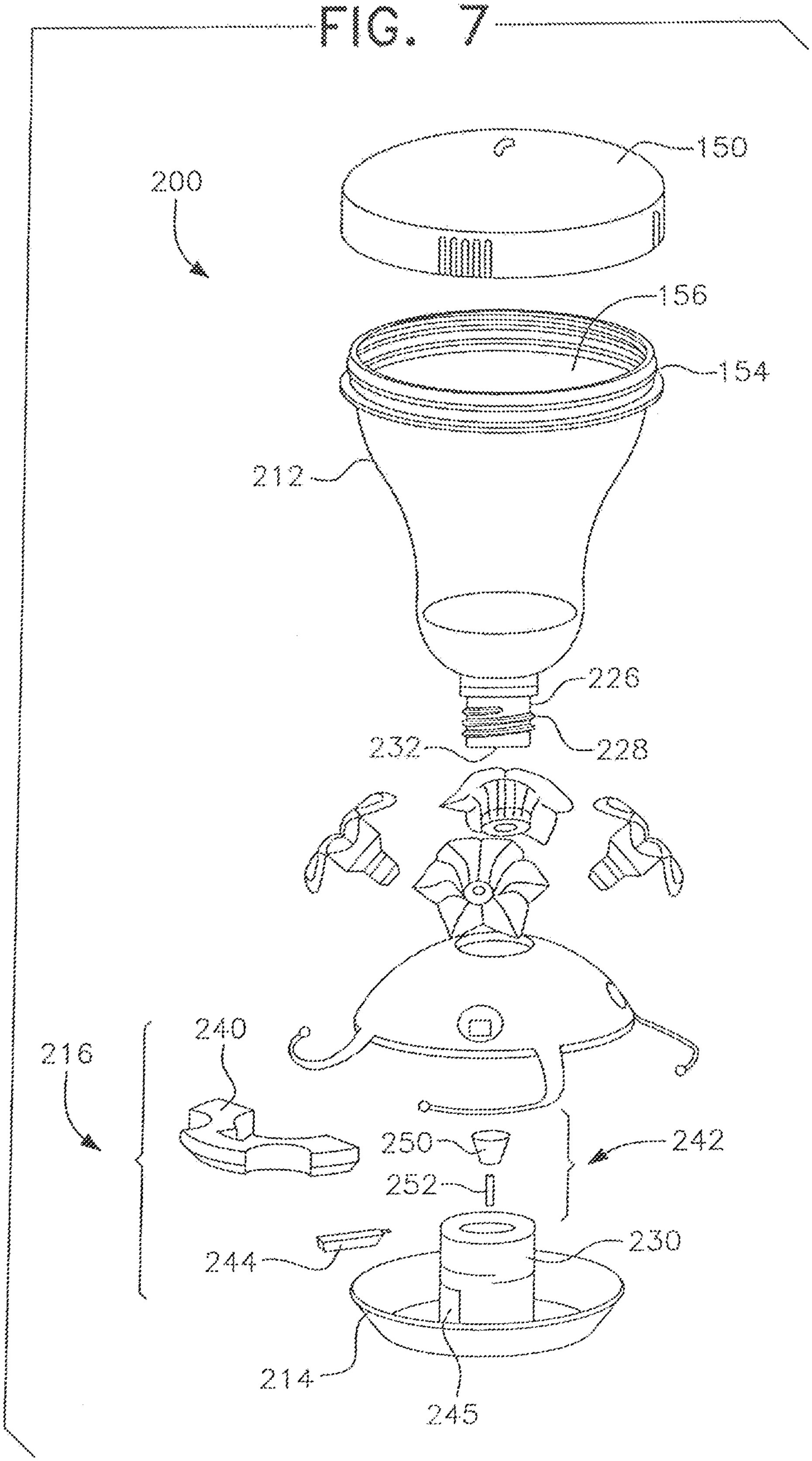
FIG. 7 is an exploded side perspective view of the components of a top-fill hummingbird feeder in accordance with a third embodiment of the present invention.
Figure 7A:
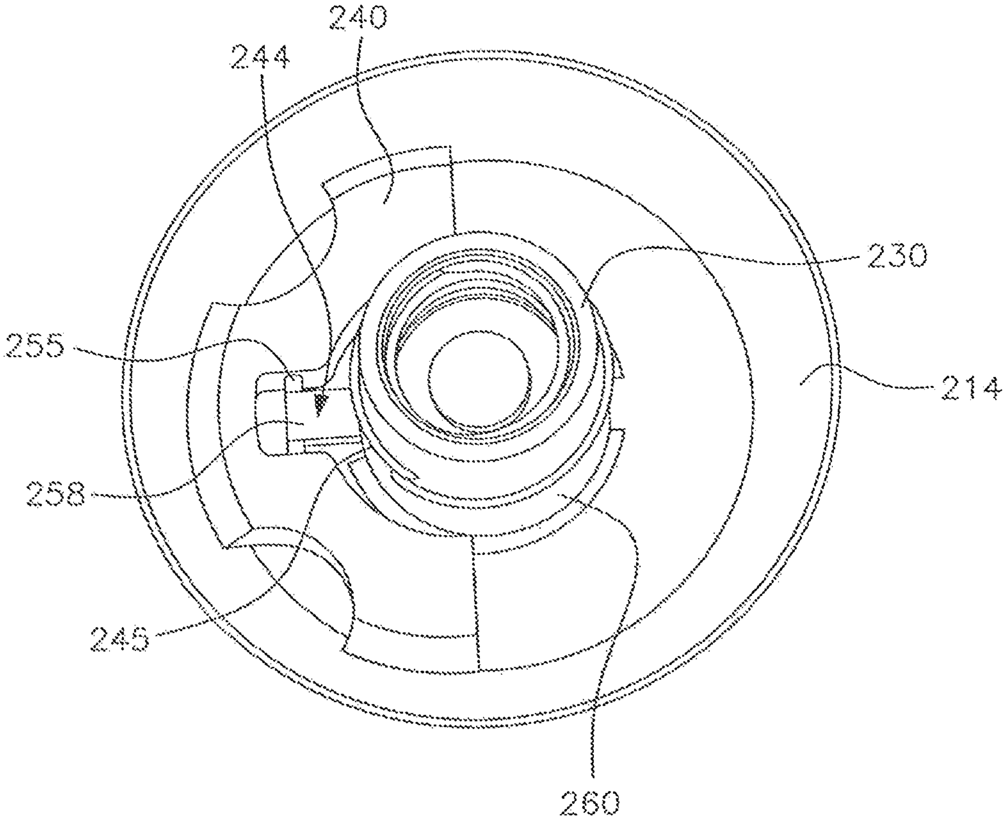
FIG. 7A is a perspective view of the float valve as mounted in the cylindrical well of the feeder shown in FIG. 7.
Figure 8:
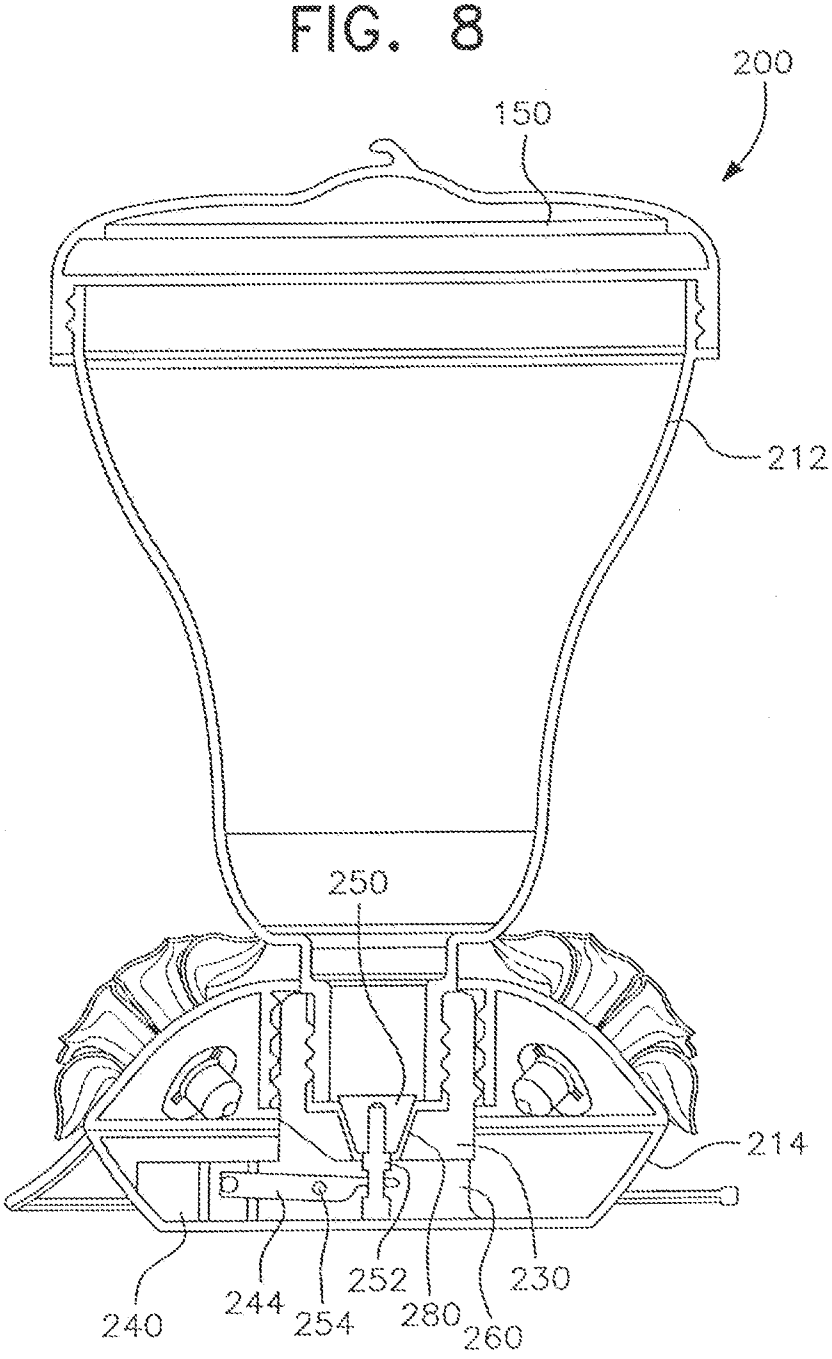
FIG. 8 is a sectional assembled side view of the feeder shown in FIG. 7.

The bottom of the liquid container 212 forms a generally cylindrical bottleneck-shaped extension 226 with external threads 228 so that it can be screw-threaded into the mating threads of a cylindrical wall 229 of an upwardly extending cylindrical well 230 of the feeding basin 214, as shown in FIG. 7A. The bottleneck extension 226 has an open lower end 232 configured to engage with and be sealed by the sealing or valve mechanism 216.

The sealing or valve mechanism 216 includes a float 240 connected by a lever 244 to a seal assembly, generally designated by reference numeral 242. The seal assembly 242 includes a plug 250 mounted on the upper end of a generally vertical post 252 positioned centrally within the upwardly extending well 230. The lever 244 is pivotally mounted at a central part thereof by a pivot pin 254 to a base 260 of the cylindrical well 230. A first end 256 of the lever 244 is received through a port 245 in the side of the base 260 and is coupled to a lower portion of the post 252. A second end 258 of the lever 244 is coupled to the float 240 by a pivot pin 255.

Figure 9:
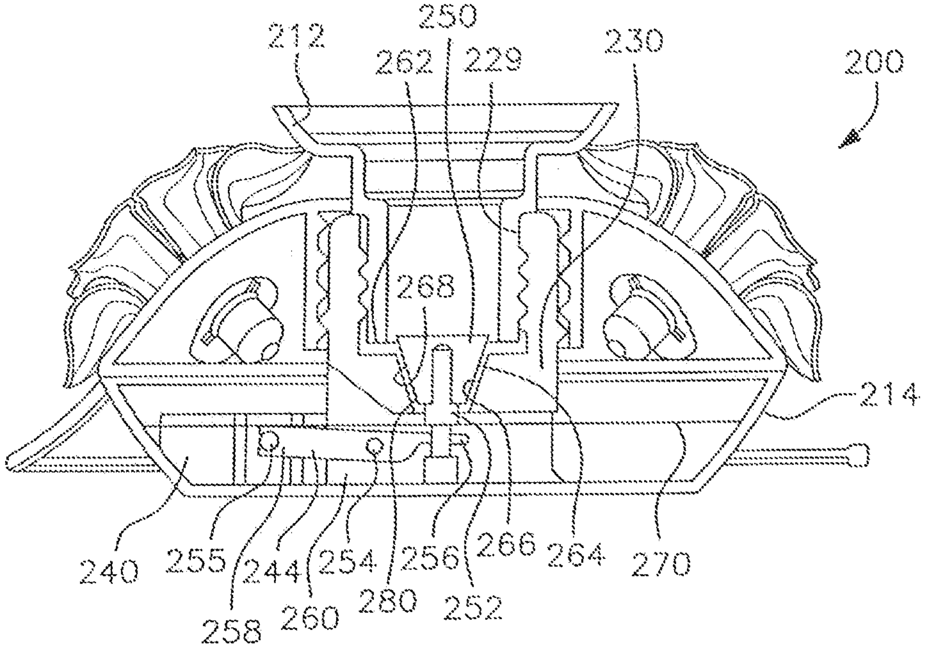
FIG. 9 is an enlarged sectional side view of the feeding basin, sealing mechanism and lower end of the liquid container of the feeder shown in FIG. 7, depicted in the open position.

The base 260 of the cylindrical well 230 includes a flat sealing edge portion 262 that surrounds a hollow center portion 264 having an inverted truncated conical shape with sloped sides 266 (see FIG. 9). The sealing edge portion 262 closes off the open lower end 232 when the bottleneck extension 226 is screw-threaded into the well 230. The plug 250 has an inverted truncated conical shape complementary with that of the hollow center portion 264 so that the sloped outer surface 268 of the plug 250 fits in sealing engagement with the sloped side surface 266 of the center portion 264 when the two are in abutment.

The plug 250 is vertically movable within the hollow center portion 264 between an upper position (shown in FIG. 9) and a lower position (shown in FIG. 10) in response to vertical movement of the post 252 upon which the plug 250 is mounted. Vertical movement of the post 252 is initiated by the position of the float 240 which, in turn, is determined by the fluid level 270 in the feeding basin 214. When the fluid level is low, as in FIG. 9, the float 240 is also in a low position. The weight of the float 240 combined with the mechanical advantage of the lever 244, provides enough force to lift the post 252 and the plug 250 against the fluid pressure in the container 212. In this upper position, the plug 250 is pushed up from the hollow center portion 264 so as to be spaced therefrom sufficiently to open a fluid flow channel 280 between the outer surface 268 of the plug 250 and the mating side surface 266 of the well base center portion 264.

Figure 10:
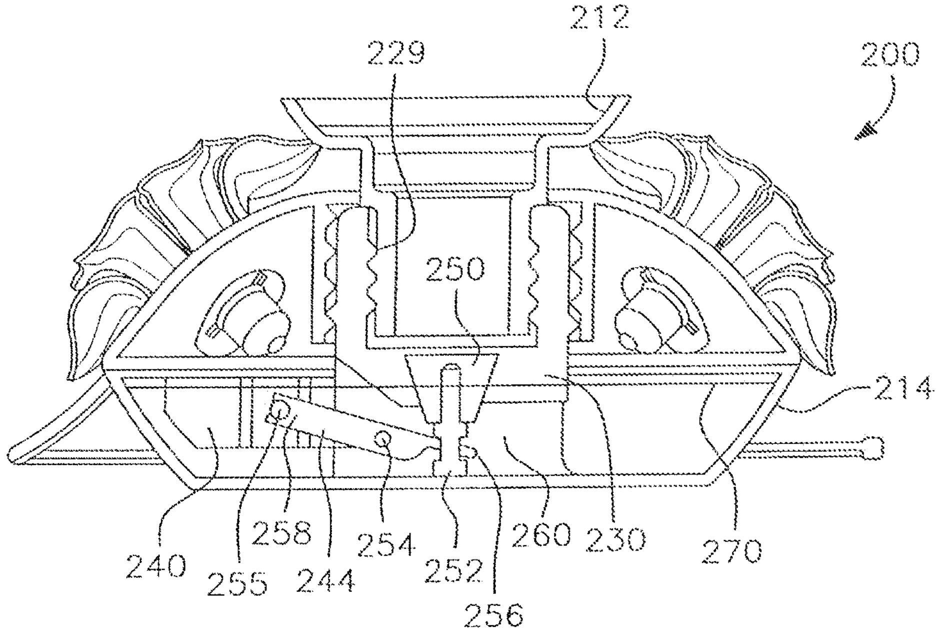
FIG. 10 is an enlarged sectional side view of the feeding basin, sealing mechanism and lower end of the liquid container of the feeder shown in FIG. 7, depicted in the closed position.

As the float 240 rises with the fluid level 270, the lever 244 pivots on pin 254 to allow the plug 250 to move downwardly to the lower position shown in FIG. 10. In the lower position, the plug comes into sealing engagement with the side surface 266 of the well base 260, closing the fluid flow channel 280 and forming a seal so as to prevent additional nectar from entering the feeding basin 214. Fluid pressure in the container also helps to keep the seal closed.

A float valve style hummingbird feeder in accordance with a fourth embodiment of the present invention is shown in FIGS. 11-15 and is generally designated by reference numeral 300. The feeder consists of a reservoir bottle or liquid container generally designated by reference numeral 312, a feeding basin generally designated by reference numeral 314, and a sealing mechanism generally designated by reference numeral 316. The liquid container has a large opening at its upper end that is closed by a removable cap in the same manner as in the second and third embodiments and with corresponding reference numerals, and therefore a discussion thereof will not be repeated here.

Figure 11:
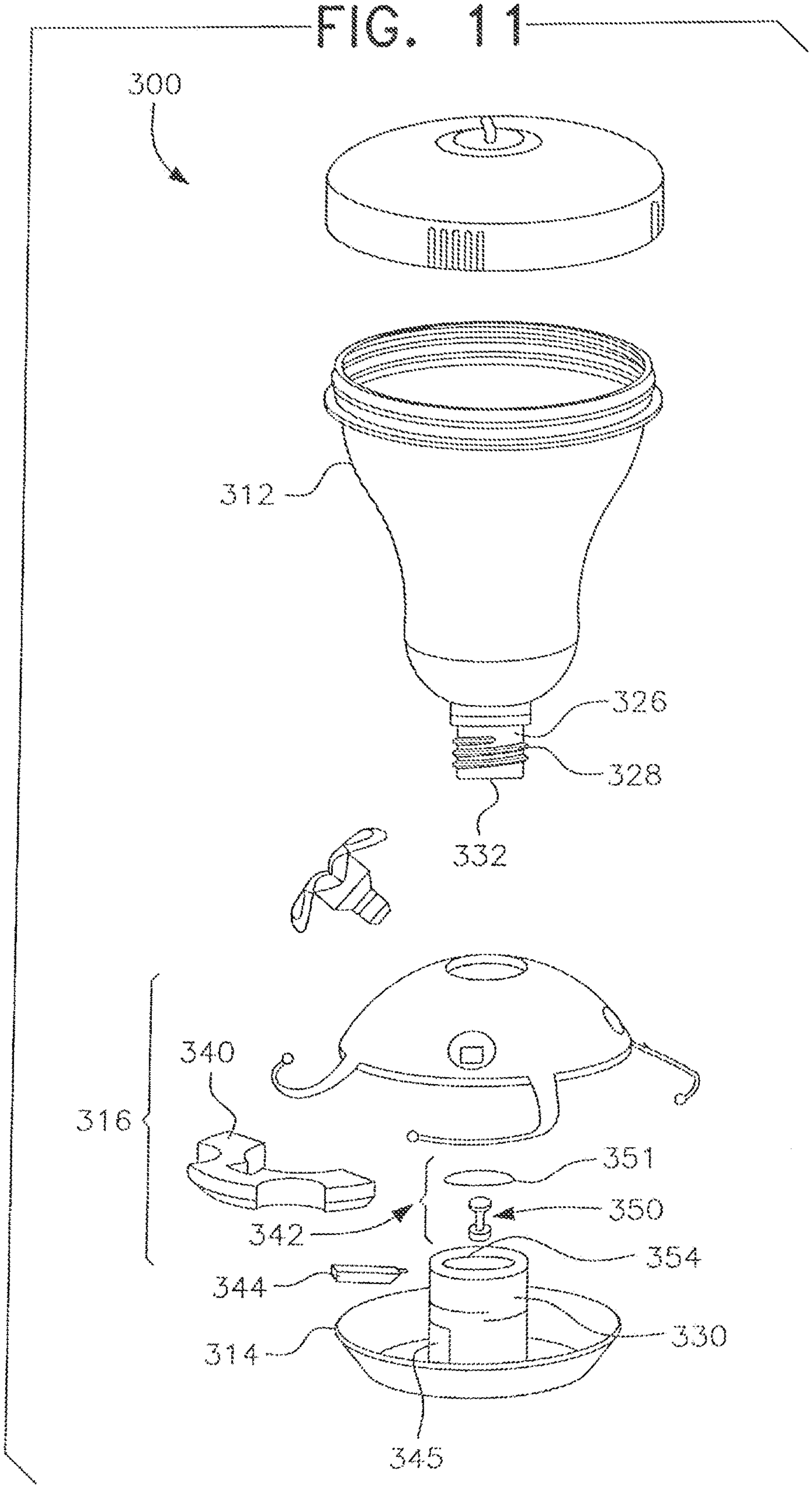
FIG. 11 is an exploded side perspective view of the components of a top-fill hummingbird feeder in accordance with a fourth embodiment of the present invention.
Figure 11A:
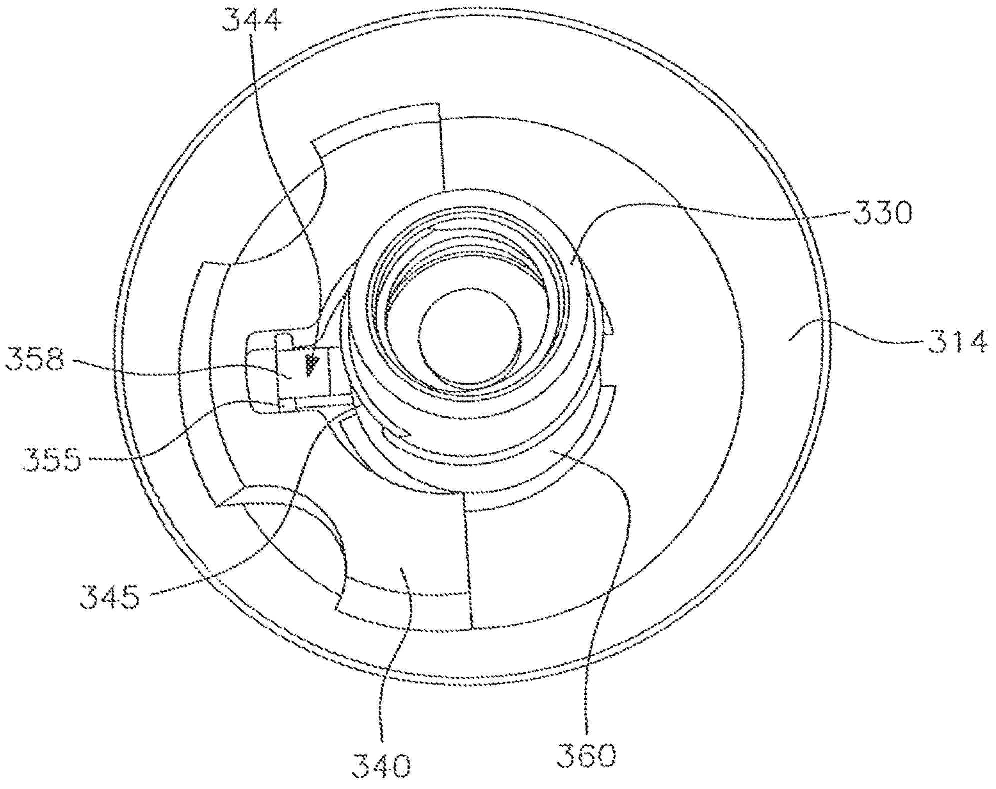
FIG. 11A is a perspective view of the float valve as mounted in the cylindrical well of the feeder shown in FIG. 11.

The bottom of the liquid container 312 forms a generally cylindrical bottleneck-shaped extension 326 with external threads 328 so that it can be screw-threaded into the mating threads of a cylindrical wall 329 of an upwardly extending cylindrical well 330 of the feeding basin 314, shown in FIG. 11A. The well includes an inner flange having a generally flat upper surface 333 that supports the sealing mechanism.

The bottleneck extension 326 fits within the well 330 and has an open lower end 332 configured to engage with and be sealed by the sealing or valve mechanism 316.

The sealing or valve mechanism 316 includes a float 340 connected by a lever 344 to a seal assembly, generally designated by reference numeral 342. The seal assembly 342 includes a sealing plate 351 with a hole 349 therein and a plug generally designated by reference numeral 350 movably mounted in the hole. The lower surface 353 of the sealing plate 351 is in scaling abutment with the upper surface 333 of the well flange 331 so that, when the bottle is screwed into the well, the lower end 332 of the bottleneck comes into sealing engagement with the upper surface 381 of the sealing plate 351 and fluid can only escape from the bottle through the hole 349 in the plate 351.

The plug 350 includes a post 383 that extends through the hole 349 and an enlarged head 385 on the upper end of the post 383 above the sealing plate 351. The outer diameter of the post 383 is smaller than the inner diameter of the hole 349, while the outer diameter of the head is larger than the hole diameter so as to completely cover the upper mouth of the hole. The plug functions as a valve to close the hole 349. Specifically, gravity and water pressure 391 act on the upper surface 387 of the head 385 to push the plug 350 downwardly and bring the lower surface 389 of the head into sealing abutment with the upper surface 381 of the sealing plate 351. When the plug is in this lower position, as shown in FIG. 15, fluid cannot flow through the hole 349.

The lever 344 is pivotally mounted at a central part thereof to a base 360 of the well 330 by a pivot pin 354. A first end 356 of the lever 344 is received through a port 345 in the side of the base 360 and extends under the plug 350. A second end 358 of the lever 344 is coupled to the float 340 by a pivot pin 355.

The plug 350 is vertically movable within the hole 349 between an upper position (shown in FIG. 14) and a lower position (shown in FIGS. 12 and 15) in response to vertical movement of the first end 356 of the lever 344. Vertical movement of the lever first end 356 is initiated by the position of the float 340 which, in turn, is determined by the fluid level 370 in the feeding basin 314 (see FIGS. 14 and 15). When the fluid level is low, as in FIG. 14, the float 340 is also in a low position. The weight of the float 340 acts on the lever 344, which pushes the plug 350 upwardly against the fluid pressure in the container 312. In this upper position, the plug 350 is pushed up such that the lower surface 389 of the head 385 is spaced above the upper surface 381 of the sealing plate 351. This spacing exposes the hole and, since the outer diameter of the post 383 is smaller than the inner diameter of the hole 349, fluid is enabled to flow around the post and through the hole 349 to fill the basin 314. As is evident, the weight of the float must be greater than the weight of the plug and the fluid pressure in the container 312.

Figure 12:
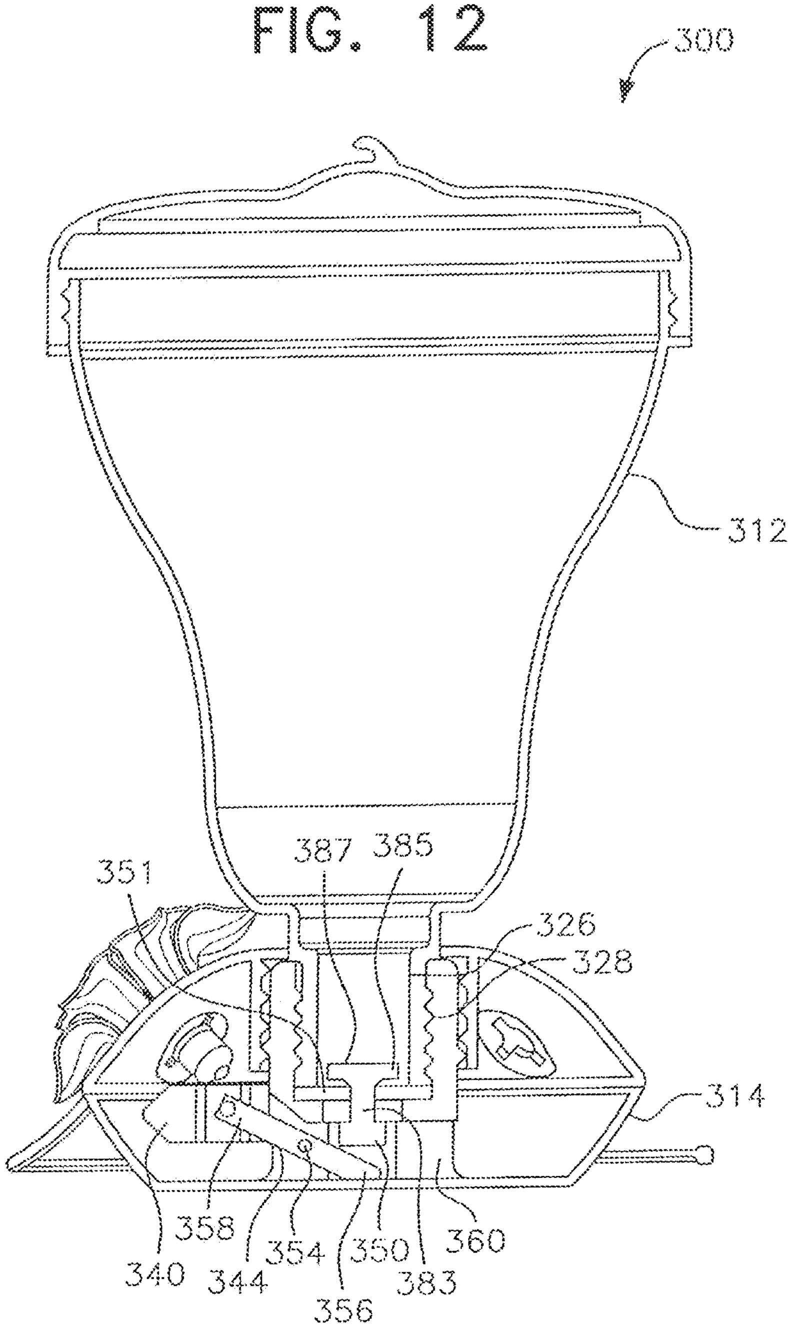
FIG. 12 is a sectional assembled side view of the feeder shown in FIG. 11.
Figure 13:
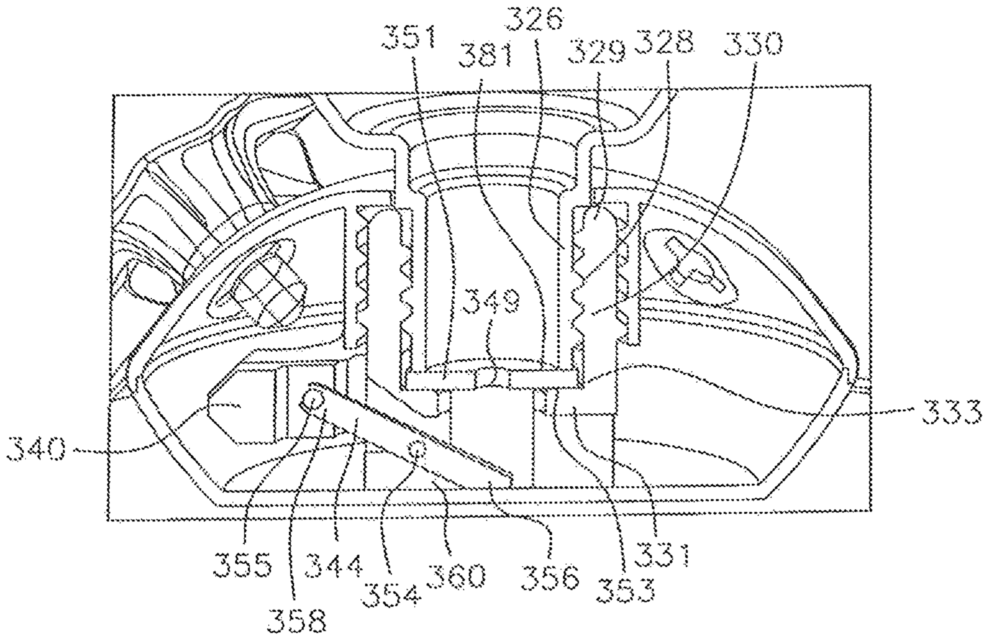
FIG. 13 is an enlarged sectional side view of the feeding basin, sealing plate and bottleneck extension of the feeder shown in FIG. 11, without the plug to show the hole in the plate.
Figure 14:
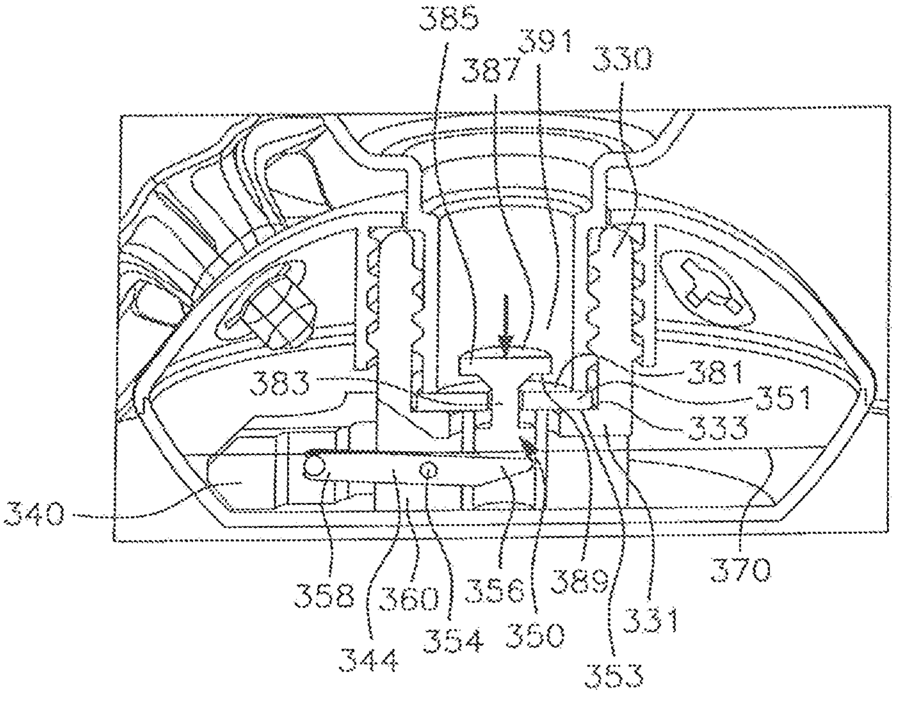
FIG. 14 is an enlarged sectional side view of the feeding basin, sealing mechanism and lower end of the liquid container of the feeder shown in FIG. 11, depicted in the open position.
Figure 15:
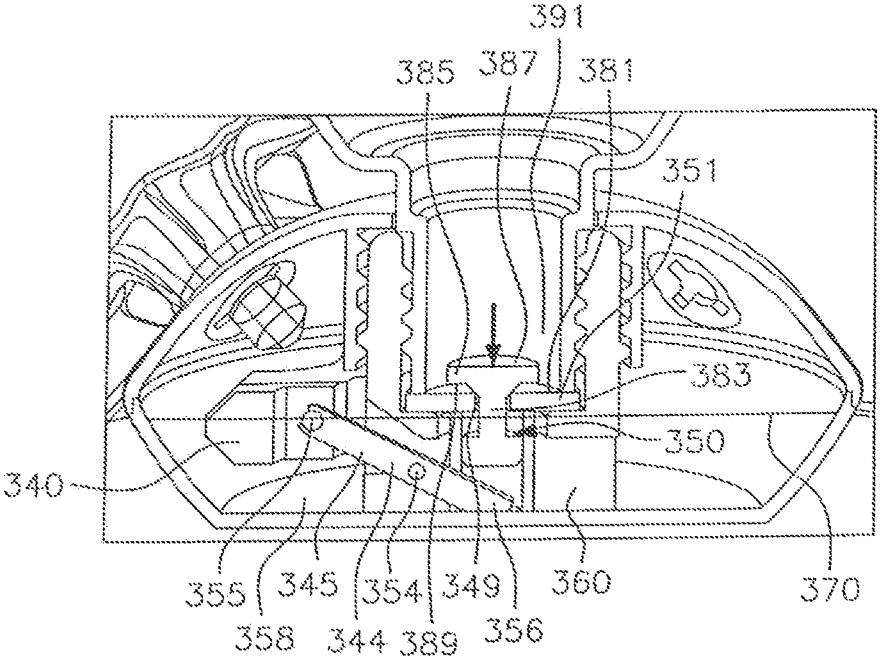
FIG. 15 is an enlarged sectional side view of the feeding basin, sealing mechanism and lower end of the liquid container of the feeder shown in FIG. 11, depicted in the closed position.

As the float 340 rises with the fluid level 370, the lever 344 pivots on pin 354 to allow the plug 350, in response to gravity and fluid pressure in the container, to move downwardly to the lower position shown in FIGS. 12 and 15. In the lower position, the lower surface 389 of the head 385 comes into sealing engagement with the upper surface 381 of the sealing plate 351, closing the hole 349 and forming a seal so as to prevent additional nectar from entering the feeding basin 314. As is evident, the float must have a buoyancy greater than its weight.

Figure 16:
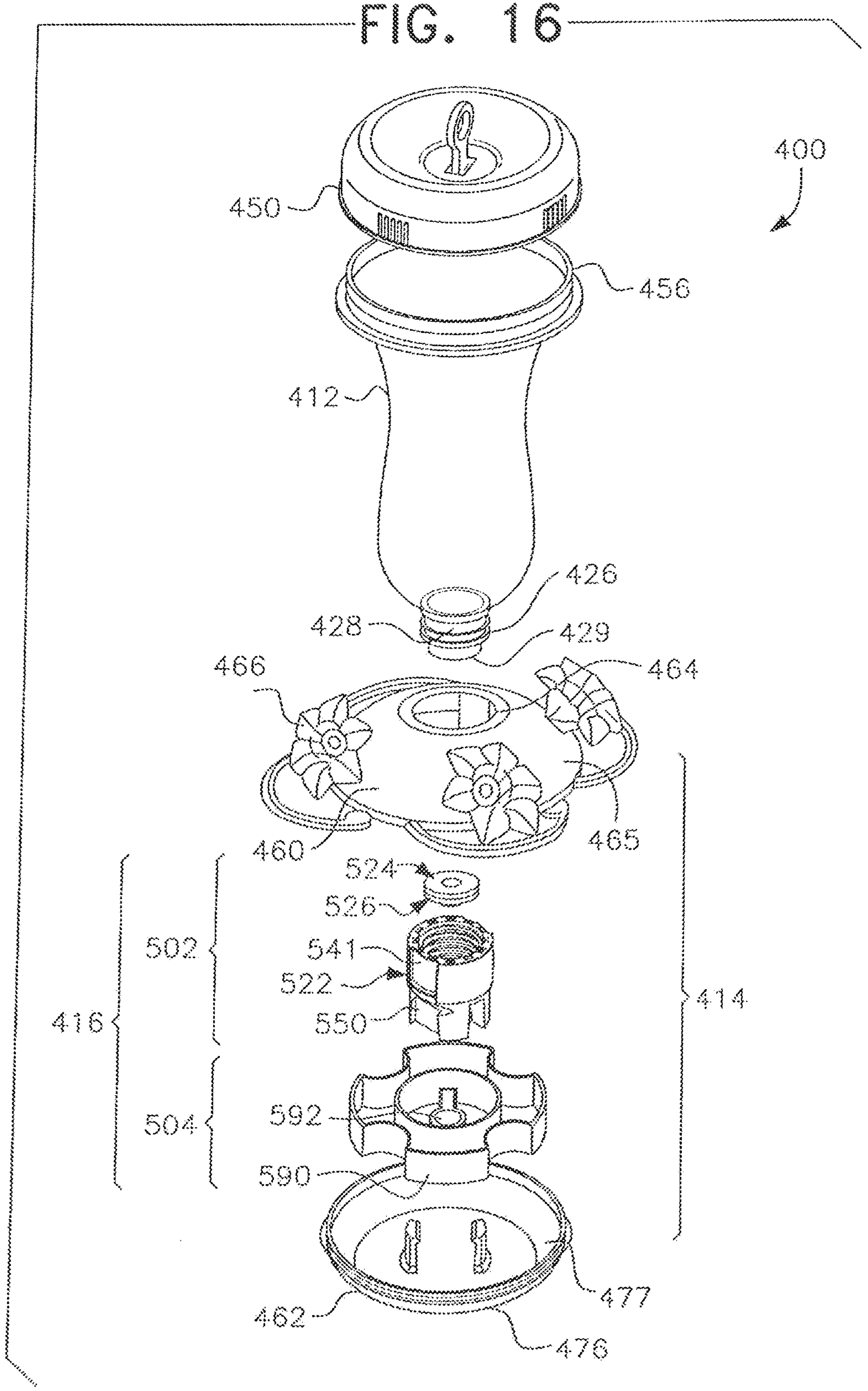
FIG. 16 is an exploded side perspective view of the components of a top-fill hummingbird feeder in accordance with a fifth embodiment of the present invention.

A float valve style hummingbird feeder in accordance with a fifth embodiment of the present invention is shown in FIGS. 16-29 and is generally designated by reference numeral 400. As shown in FIG. 16, the feeder consists of a reservoir bottle or liquid container generally designated by reference numeral 412, a feeding basin generally designated by reference numeral 414, and a sealing mechanism generally designated by reference numeral 416. The bottom of the liquid container 412 forms a generally cylindrical bottleneck-shaped extension 426 with external threads 428 and a lower edge 429. The sealing mechanism 416 includes a bottle seal assembly, generally designated by reference numeral 502, and a float valve, generally designated by reference numeral 504, that is configured for engagement with the bottle seal assembly 502. A removable top or cap 450 closes off the large opening 456 at the upper end of the liquid container 412 and is vented to prevent a vacuum condition in the container in the same manner as in the previous embodiments.

Figure 17:
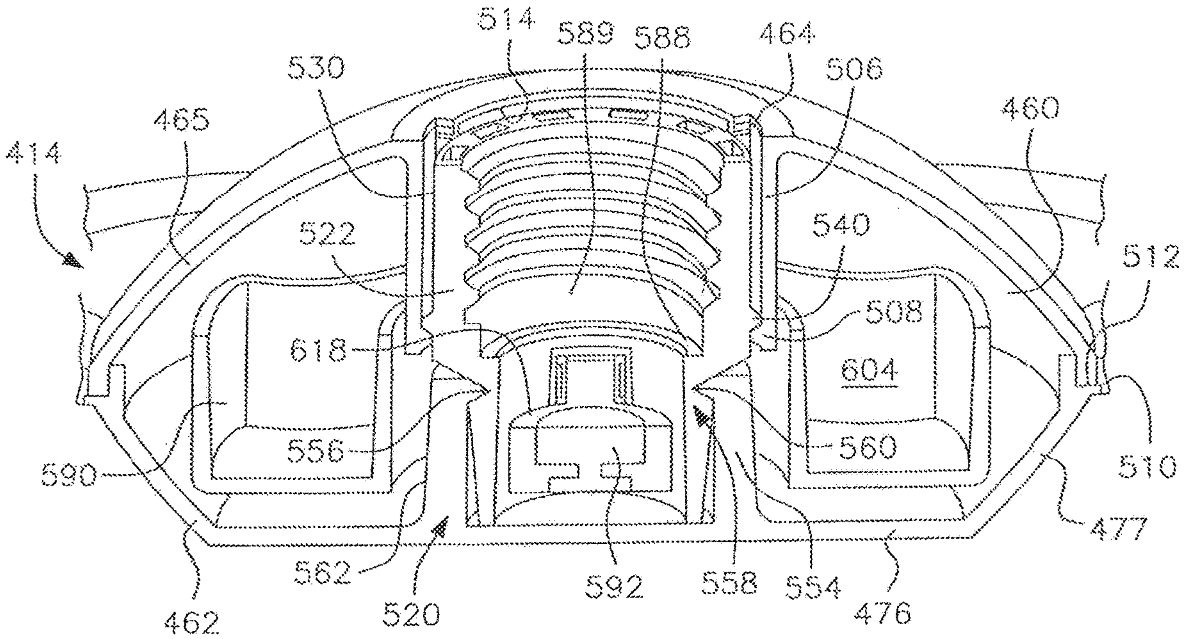
FIG. 17 is a sectional perspective view of the cover and base as assembled with the float valve and bottle collar therein, showing the coupling between the cover and the bottle collar.

The feeding basin 414 includes a base 462 and a removable cover 460. The base has a bottom 476 and an upwardly directed outer wall 477. The cover 460 is preferably dome-shaped, with a central opening 464 at the upper end of the dome and a downwardly directed outer wall 465. Two arms 506 project downwardly from the upper end of the dome adjacent the central opening 464 as shown in FIG. 17. At the lower end of each arm is a coupling element 508 which will be described more fully hereinafter.

The lower edge 510 of the cover outer wall 465 is configured to form a sealing connection with an upper edge 512 of the base outer wall 477 when the basin is assembled. The central opening 464 in the cover 460 receives the bottleneck extension 426 and has an inner edge 514 configured to generally conform with the outer surface of the container 412. The bottom 476 of the base 462 is provided with a guide structure generally designated by reference numeral 520 that will be described hereinafter.

Figure 18:
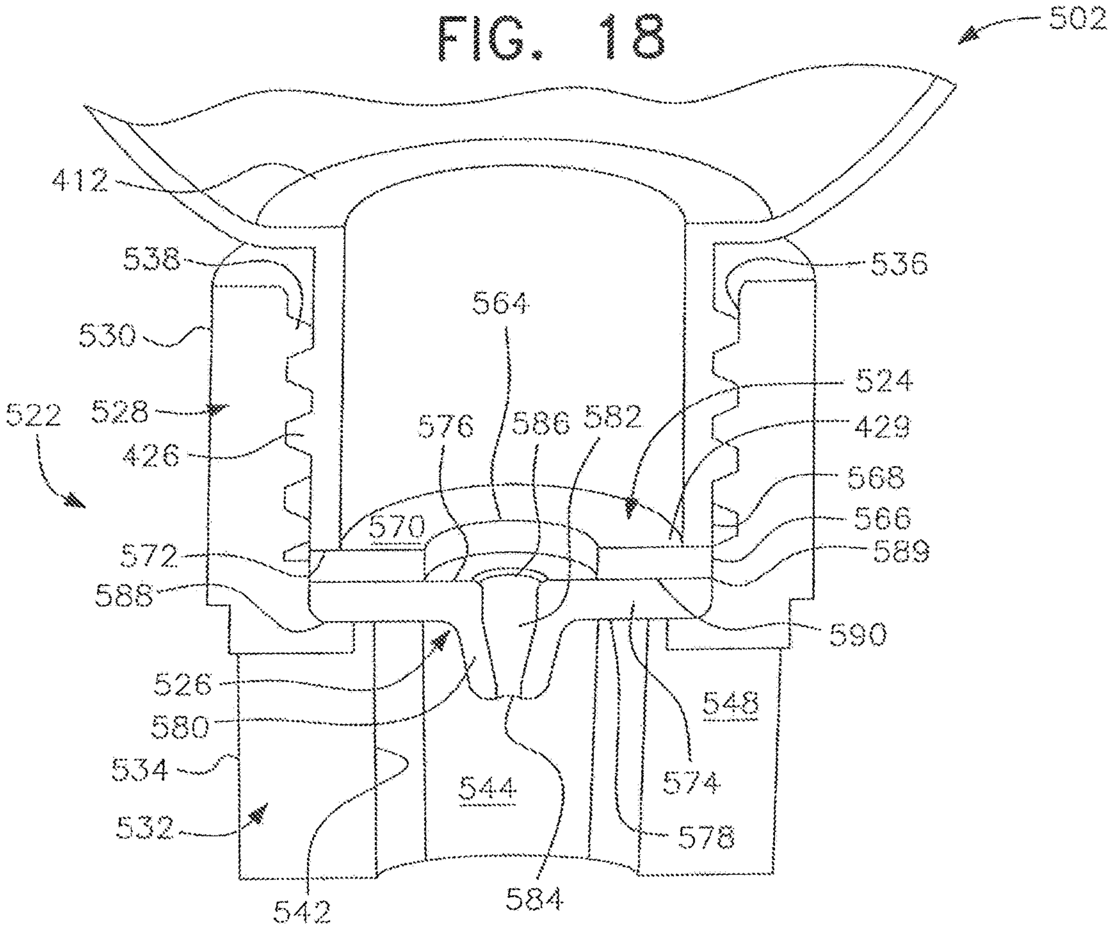
FIG. 18 is an enlarged sectional perspective view of the bottle seal and nozzle of the feeder shown in FIG. 16.

As shown in FIG. 18, the bottle seal assembly 502 includes a bottle collar generally designated by reference numeral 522, a bottle seal generally designated by reference numeral 524, and a nozzle member generally designated by reference numeral 526.

Figure 18A:
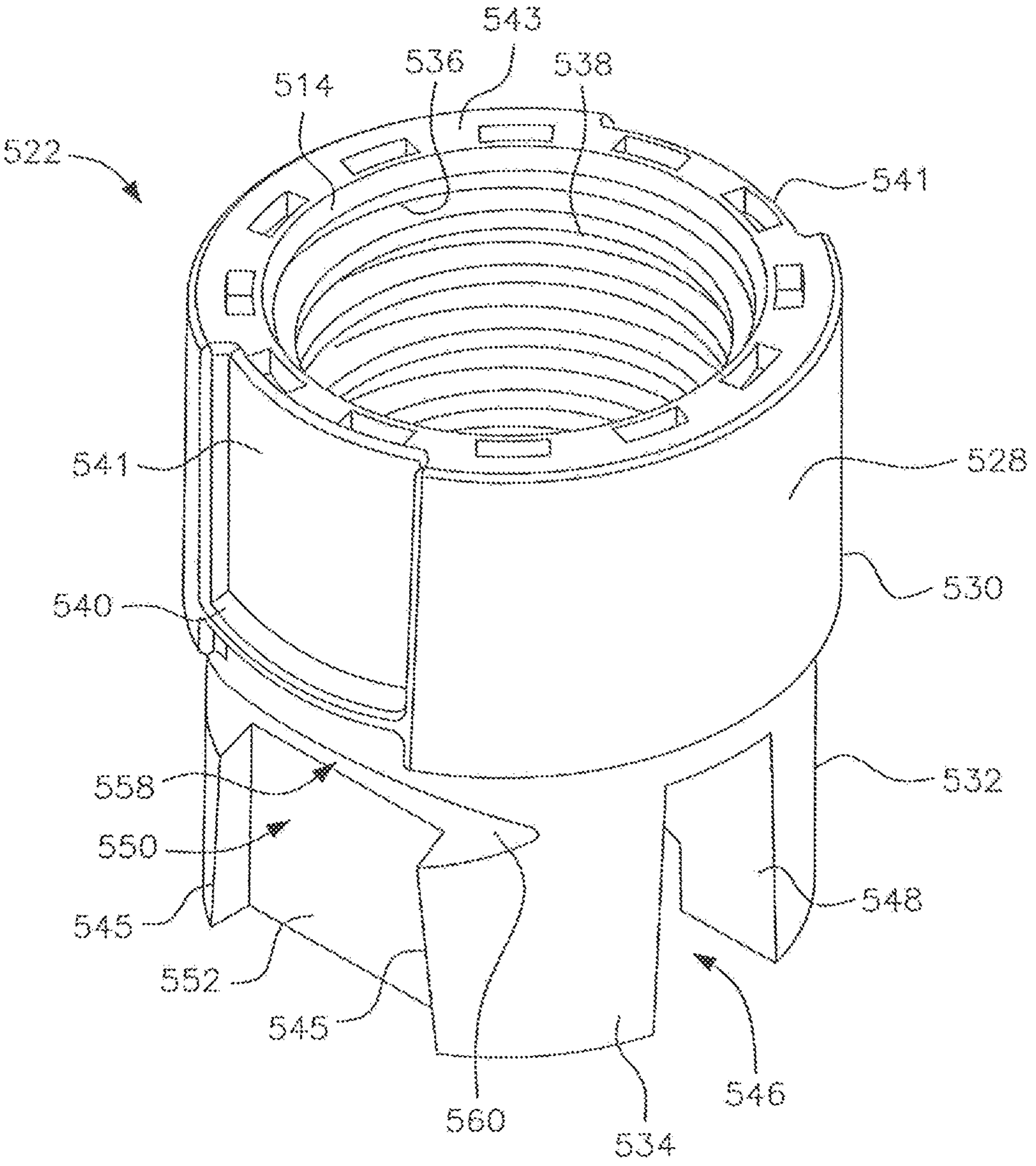
FIG. 18A is an enlarged perspective view of the bottle collar shown in FIG. 16.

As best seen in FIG. 18A, the bottle collar 522 is preferably a single-piece molded assembly having an upper part, generally designated by reference numeral 528, with a substantially cylindrical outer wall 530 and a lower part, generally designated by reference numeral 532, also having an outer wall 534 defining a substantially cylindrical shape. The inner surface 536 of the bottle collar upper part 528 has internal threads 538 that allow the bottleneck extension, with its external threads 428, to be screw-threaded into the collar 522 to couple the bottleneck extension to the collar.

Figure 21:
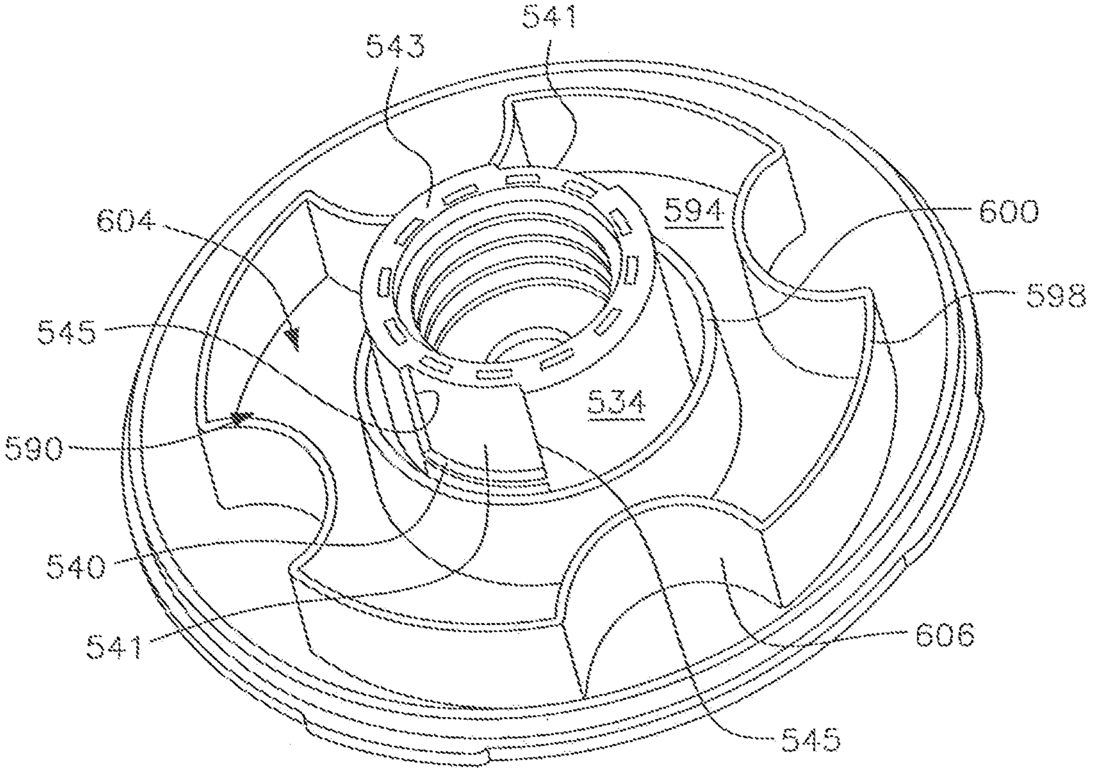
FIG. 21 is a perspective view of the bottle seal assembly, float valve and feeding basin base shown in FIG. 19, as assembled.
Figure 22:
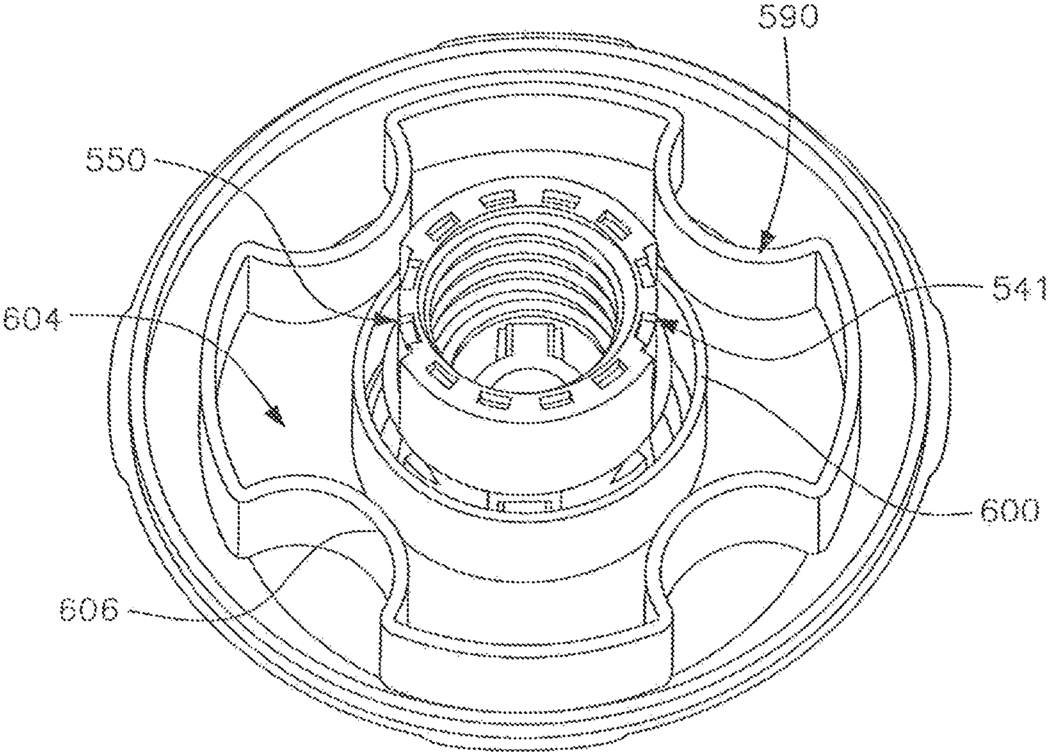
FIG. 22 is another perspective view of the assembled components shown in FIG. 21.

As shown in FIGS. 17, 18A and 21, the upper part outer wall 530 includes two upper alignment recesses 541 on opposing sides thereof. At the base of each recess 541 is a coupling element 540, preferably formed integrally with the upper part wall 530, that engages with the coupling elements 508 on the lower ends of the cover arms 506 to lock the cover 460 to the bottle collar 522 when the feeder is assembled. According to a preferred embodiment, the coupling element 540 on the upper part outer wall 530 is a rib or flange that extends circumferentially across each upper alignment recess 541 and is generally parallel with an upper edge 543 of the bottle collar 522 (see FIG. 21). The coupling elements 508 on the cover arms 506 are preferably formed by an inwardly directed lip or tooth. When the cover 460 is pushed downwardly onto the base 462 to assemble the feeding basin, the arms 506 slide within the upper alignment recesses 541 until the lip 508 passes over the rib 540 and snaps into engagement against the lower surface of the rib.

As would be understood by persons of skill in the art, the coupling elements could have alternate configurations provided the coupling element on the collar upper part is complementary with the coupling element of the cover.

Figure 19:
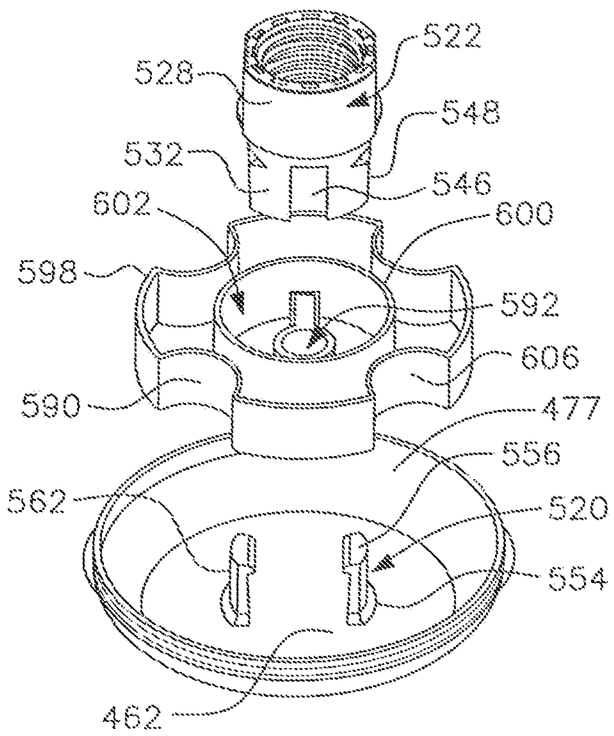
FIG. 19 is an exploded perspective view of the bottle seal assembly, float valve and feeding basin base of the feeder shown in FIG. 16.
Figure 20:
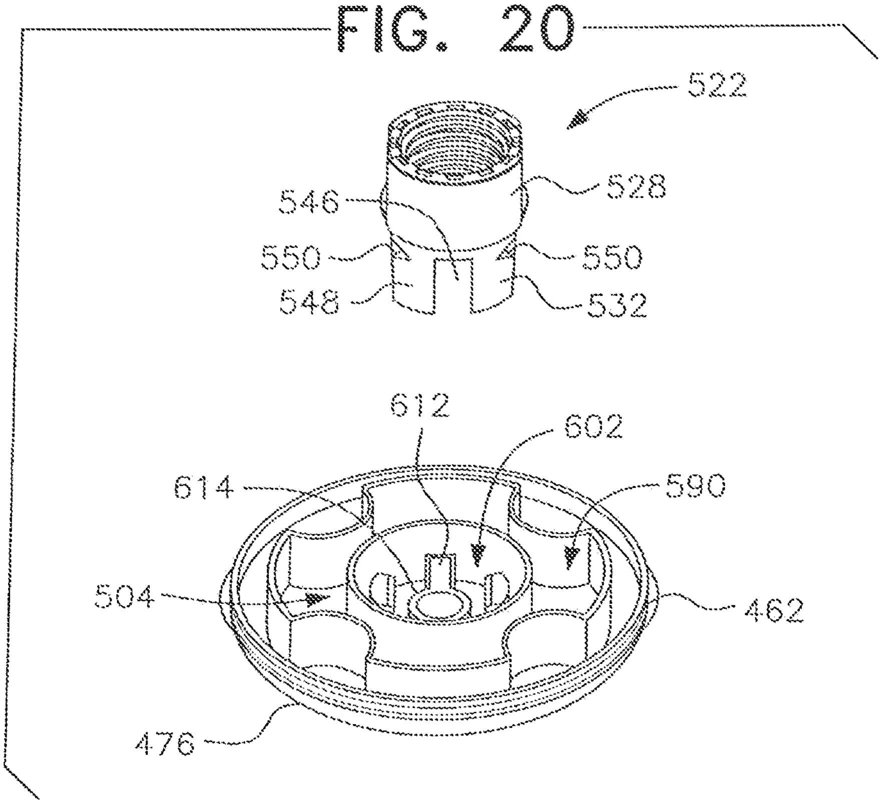
FIG. 20 is a partially exploded perspective view of the components shown in FIG. 19, with the float valve received within the feeding basin base.

The inner surface 542 of the lower part 532 is generally smooth and defines a central opening 544. As shown in FIGS. 18A, 19 and 20, a slot 546 is formed in the lower part 532 and passes through opposing sides of the lower part wall 548. The generally cylindrical outer wall 534 of the lower part 532 of the bottle collar 522 includes at least one lower alignment recess, generally designated by reference numeral 550, and preferably, there are two lower alignment recesses 550 arranged on opposing sides of the lower part 532 of the bottle collar 522. Preferably, the lower alignment recesses 550 are in generally vertical alignment with the upper recesses 541 in the upper part outer wall 530, and the opposing sides of the lower part outer wall 534 having the lower alignment recesses 550 are substantially orthogonal to the opposing sides that are slotted at 546. According to one preferred embodiment shown in FIG. 18A, the lower alignment recesses are flat notches 552 on opposing sides of the lower part outer wall 534 of the bottle collar. These flat notches 552 are cut into the opposing sides so that the recessed surface of the notch in relationship with the lower part outer wall 534 creates a stop 545 on either side of the flat notch. In addition, the flat recessed surfaces of the notches are preferably tapered from top to bottom.

Figure 26:
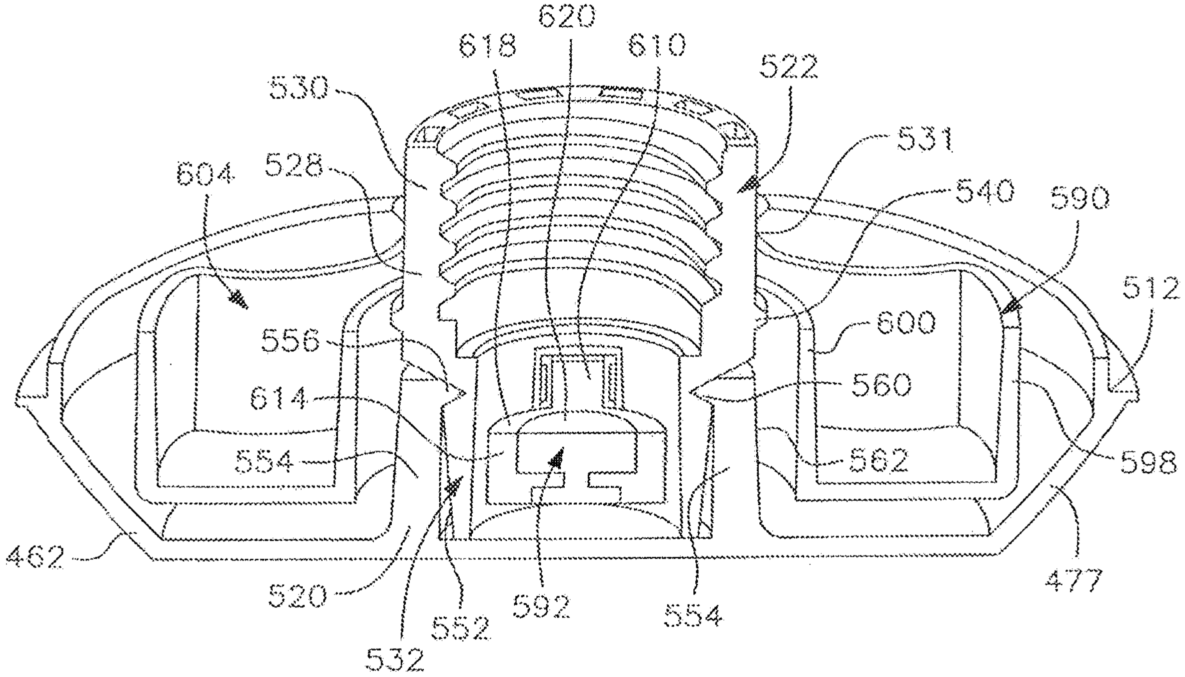
FIG. 26 is a sectional view of the float valve captured within the feeding basin base by engagement of the bottle collar with the guide structures in the base.

The guide structure 520 in the base 462 is configured to engage with the lower alignment recesses 550 on the bottle collar lower part 532 to ensure proper orientation of the bottle seal assembly 502 and the float valve 504 within the feeding basin 414 when the feeder is assembled (see FIGS. 17 and 26). According to a preferred embodiment, the guide structure 520 in the base includes two upwardly extending opposed guide panels 554 that are generally planar and substantially parallel with one another. The panels 554 are spaced from one another at a distance that allows the bottle collar lower part to be received therebetween when the lower alignment recesses 550 are positioned to be in substantially parallel relationship with the guide panels. When the bottle collar 522 is positioned between the panels 554 of the guide structure 520, the slot 546 is between and substantially parallel with the panels 554. As would be understood by persons of skill in the art, the lower alignment recesses could have alternate configurations provided the guide structure is complementary therewith to secure the bottle collar to the basin base.

The upper edges of the guide panels 554 include a connecting element 556 that engages with a complementary structure, generally designated by reference numeral 558, on the outer surface of the bottle collar. During feeder assembly, the lower part 532 of the bottle collar is inserted between the guide structures 520 with the flat notches 552 aligned with the panels 554 so that the panels are received within the notches. When the collar is fully inserted, the connecting elements 556 on the upper edges of the panels 554 are engaged with the complementary structure 558 on the outer surface of the bottle collar. According to a preferred embodiment, the complementary structure 558 is an angled notch 560 transverse to the flat notches and positioned near the top of the lower part 532 of the bottle collar and in vertical alignment with the flat notch. The connecting element 556 is an inwardly directed lip that snaps into engagement with the angled notch 560 to secure the bottle collar to the base of the basin. In addition, when the bottle collar has been secured to the basin base, the positioning of the guide panels within the flat notches 552 and between the stops 545 prevents the collar from rotating relative to the basin base. As would be understood by persons of skill in the art, the complementary structure and the connecting element could have alternate configurations provided that they work cooperatively to secure the collar to the base.

According to a preferred embodiment, the outer surface 530 of the upper part 532 has a diameter that is greater than the outermost diameter (adjacent the top) of the outer surface 534 of the lower part 532, with the flat notches being inset within the outer surface 534 of the collar lower part 532. Therefore, when the collar is fully inserted and coupled to the guide structure with the guide panels 554 fitted within the flat notches 552 as described above, the outer surfaces 530 of the upper recesses 541 formed in the upper part 528 are substantially flush with an outer surface 562 of the guide panels 554. The coupling element 540 on the upper part outer surface 530 projects outwardly therefrom to provide the lip that engages with the coupling element 508 of the cover arms 506 as described above.

The bottle seal 524 may be configured as a flat ring with a central opening 564, similar to a washer or gasket, and may be made of cork or other compressible material capable of forming a liquid seal when brought into abutment with the lower edge 572 of the bottleneck extension 426. The central opening 564 in the bottle seal 524 is smaller in diameter than the open end 429 of the bottleneck extension 426, and the outer circumference 566 of the bottle seal 524 is preferably the same as the circumference of the outer surface 568 of the bottleneck extension at the open end 429. Hence, when the bottle seal 524 is assembled as shown in FIG. 18, the upper surface 570 of the bottle seal is in abutment with the lower edge 572 of the bottleneck extension and forms a seal therewith, and the outer circumference 566 of the bottle seal 524 is flush with the outer surface 568 of the bottleneck extension 426. In addition, because the central opening 564 in the bottle seal 524 is smaller in diameter than the open end 429 of the bottleneck extension 426, the bottle seal partially closes the open end of the bottleneck extension when the bottleneck extension is screw-threaded into the cylindrical collar 522 and the lower edge 572 of the extension engages the upper surface 570 of the bottle seal, as will be further discussed hereinafter.

The nozzle member 526 includes a generally cylindrical base 574 that is substantially planar, with an upper surface 576 and a lower surface 578. Integrally formed with the base 574 is a downwardly extending nozzle 580 that projects from a central area of the nozzle member base 574. A central channel 582 extends through the base 574 and the nozzle 580. The channel 582 is open at the upper surface 576 of the base and also open at a tip 584 of the nozzle. Preferably, the channel has inwardly tapering walls so that the opening at the nozzle tip 584 is smaller than the opening 586 at the base upper surface 576. The outer surface of the nozzle 580 is also preferably tapered toward the tip 584. However, the nozzle may be any shape so long as it has a lower edge or surface configured for sealing engagement with the float valve 504 to be described hereinafter.

While the bottle seal 524 and nozzle member 526 have been described as two elements, they may be formed as a single component. According to one preferred embodiment, the bottle seal is an overmolded silicon piece subsequently molded as one piece to the nozzle member.

Where the lower end of the upper part 528 of the bottle collar 522 meets the upper end of the lower part 532, an inwardly extending, annular shelf 588 is formed that creates a shoulder with wall element 589 at the upper part lower end. When the nozzle member 526 and bottle seal 524 are assembled and the bottleneck extension is fully threaded into the collar, a lower surface 578 of a peripheral portion of the nozzle member base 574 is in abutment with and supported by shelf 588, and the bottle seal 524 is on top of the nozzle member 526 with the bottle seal lower surface 590 in abutment with the upper surface 576 of the nozzle member. Both the bottle seal and the nozzle member are centered by the shoulder wall element 589. When so assembled, the bottle seal 524 and nozzle base 574 effectively close most of the open end 429 of the bottleneck extension leaving only the central channel 582 to provide a liquid flow path from the container 412 into the feeding basin 414.

Figure 23:
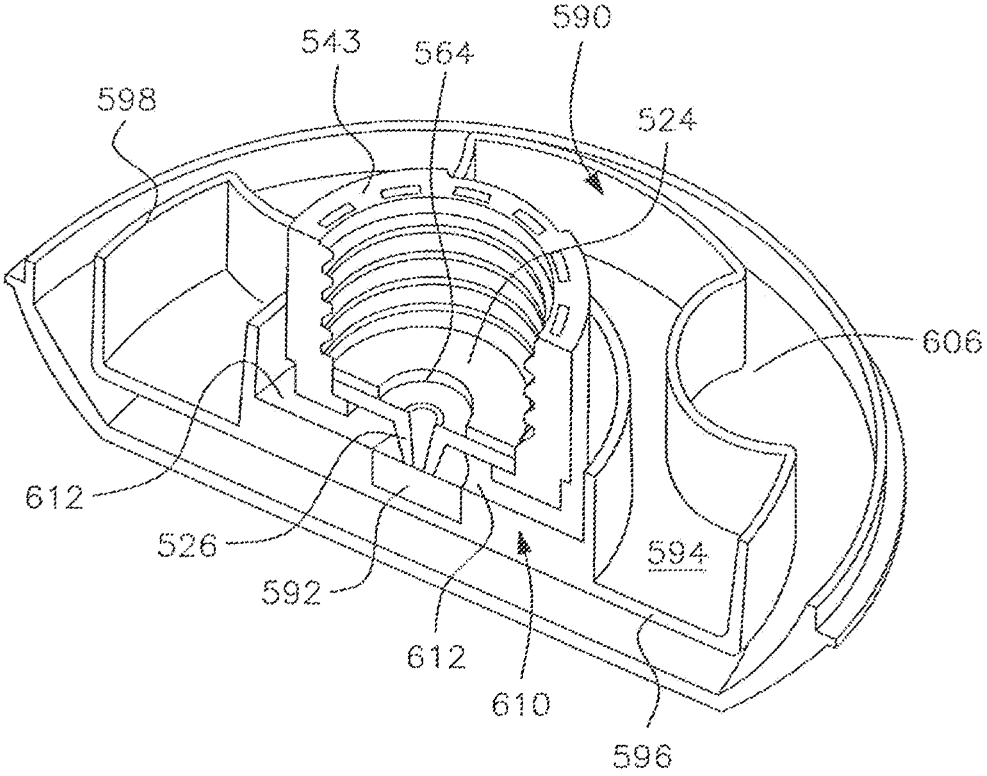
FIG. 23 is an enlarged sectional perspective view of the bottle seal assembly, float valve and feeding basin base as shown in FIG. 21.
Figure 24:
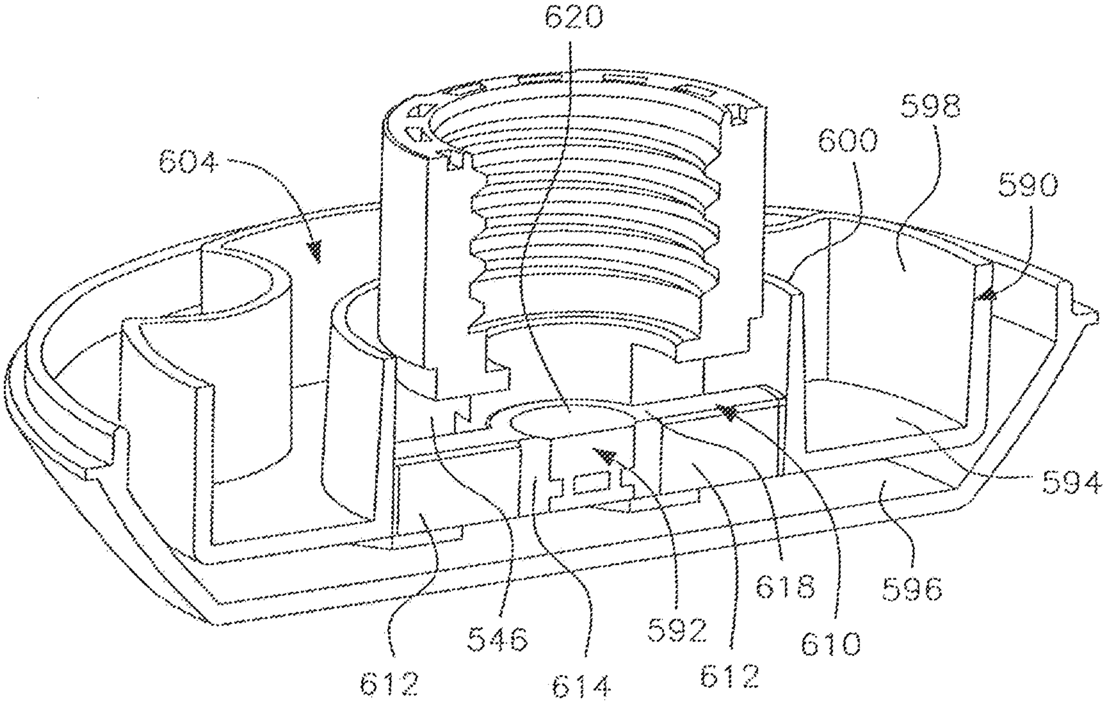
FIG. 24 is another enlarged sectional perspective view of the bottle seal assembly, float valve and feeding basin base as shown in FIG. 21.
Figure 25:
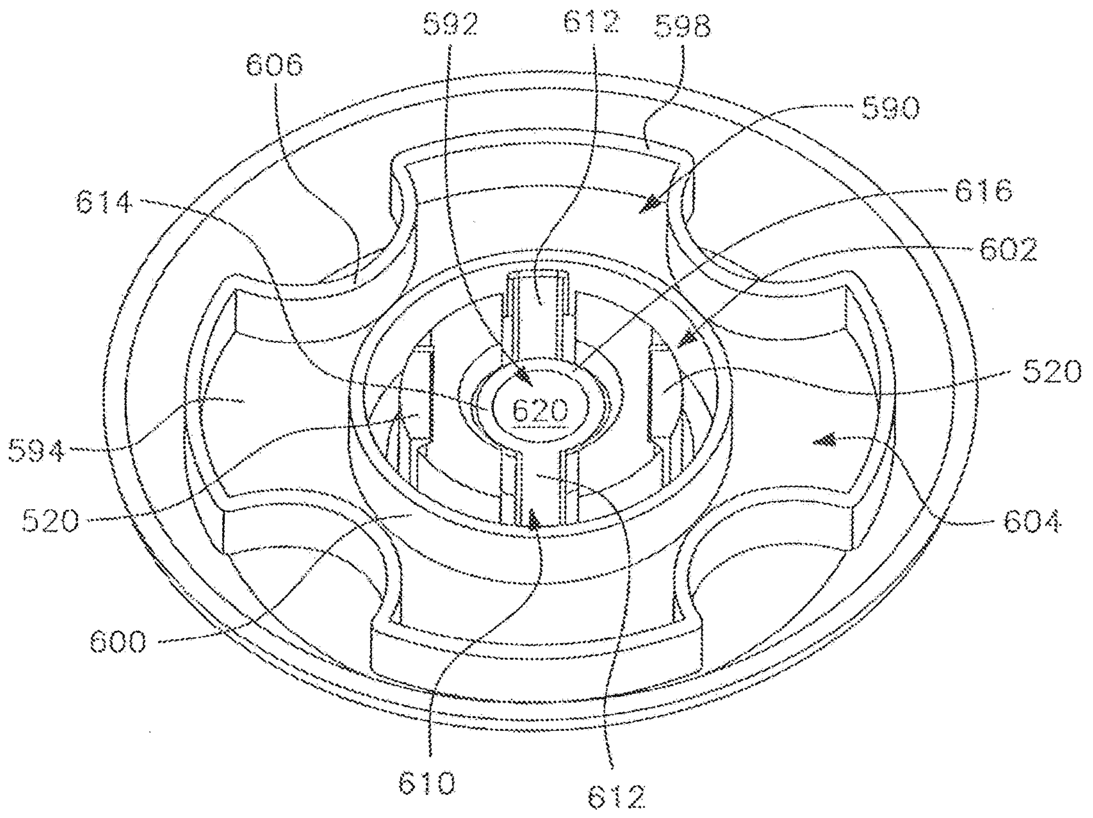
FIG. 25 is a perspective view of the float valve within the feeding basin base and a cutaway view of the bottle seal assembly showing the lower part as engaged with the guide structure of the feeding basin base.

As shown in FIGS. 23-25, the float valve 504 includes a float generally designated by reference numeral 590 and a float seal generally designated by reference numeral 592. The float 590 has a bottom part 594 with a substantially flat lower surface 596, an upstanding outer wall 598 and an inner wall 600. The inner wall 600 extends upwardly from the bottom part 594 and defines a central area, generally designated by reference numeral 602, of the float. The central area 602 is preferably cylindrical although other shapes could be used provided the central opening is able to receive the collar 522. The outer wall 598 also extends upwardly from the bottom part 594 and is spaced from the inner wall 600 to define an open chamber, generally designated by reference numeral 604. The open chamber 604 is delimited by the bottom part 594, the outer wall 598 and the inner wall 600. The chamber 604 is generally annular, but the outer wall 598 is provided with spaced cutouts 606 for receiving nectar. These spaced cutouts 606 come into alignment with the feeding ports 466 in the cover 460 when the feeder is assembled. The float 590 is made of a material that will float in water and/or nectar so that, as the nectar level in the feeding basin rises, the float moves to an upper position and when the nectar level drops, the float moves to a lower position. Accordingly, the float may be shaped in any number of configurations with or without an open chamber, provided the material from which the float is made is sufficiently buoyant to move up and down with corresponding changes in the nectar level.

Extending across the central area 602 is a bridge, generally designated by reference numeral 610, that substantially bisects the central area 602. The bridge 610 has two arms 612 in linear alignment with one another. The arms 612 extend inwardly into the central area 602 and are joined by a center piece 614 having generally cylindrical sides 616 and a flat upper surface 618 (sec FIGS. 25 and 26).

The float seal 592 is inset within or otherwise secured to the center piece 614. As shown in FIG. 24, the center piece 614 may have a hollow area into which the float seal 592 is inserted. The float seal 592 is preferably inset within the center piece 614 so that an upper surface 620 of the float seal is flush with the upper surface 618 of the center piece (see FIG. 24). Alternatively, the float seal may project upwardly from the center piece or be recessed therein so that the upper surface of the float seal is higher or lower than the upper surface of the center piece, respectively. In addition, the float seal may be composed of multiple pieces stacked upon or otherwise arranged with each other to present an upper surface suitable for engagement with the nozzle tip. In one preferred embodiment, the float seal is an insert molded seal 592 as shown in FIG. 24.

The float seal 592 is positioned in the center piece 614 so as to be directly below the nozzle tip 584 when the feeder is assembled. The float seal 592 is preferably made of any soft elastomer, silicon, rubber or other flexible sealing material. The nozzle 580 is made of a less flexible material than the float seal 592 to ensure that the nozzle will seat itself in the float seal to close the channel 582 in the nozzle member 526 when the float is in the upper position.

To assemble the feeder 400, the float valve 504 is positioned within the feeding basin 414 as shown in FIG. 20. Particularly, the annular portion of the float is received within the feeding basin with the outer wall 598 and cutouts 606 adjacent the base outer wall 477 and the inner wall 600 surrounding the guide panels, and the bridge 610 extending between the guide panels. The bottle seal assembly is then received within the basin by aligning the slot in the bottle collar lower part with the arms of the bridge in the central area of the float, and engaging the lower alignment recesses with the guide structure, as shown in FIGS. 19, 21 and 25. Once the bottle collar 522 is coupled to the guide panels 554 in the feeding basin base 462 by engaging connecting elements 556 into the angled notches 560, as shown in FIGS. 25 and 26, the positioning of the bridge within the slot in the bottle collar captures the float valve 504 to prevent the float from rotating. The float valve 504 is free, however, to move up and down with the nectar level.

Figure 27:
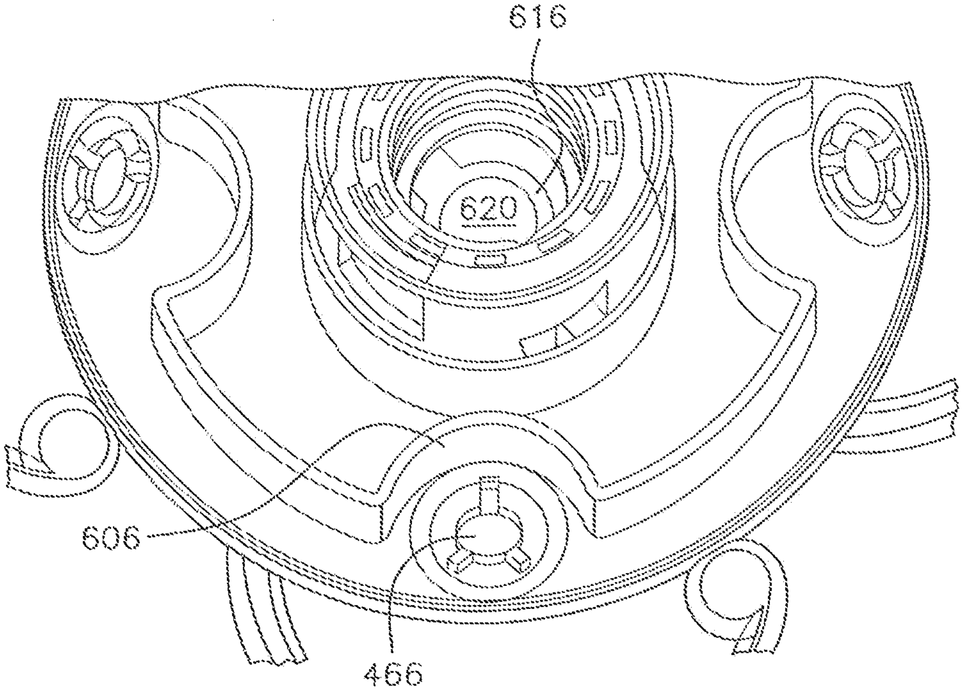
FIG. 27 is an upper perspective view of the feeding basin with the cover shown transparently in order to view the alignment of the feeding ports with the cutouts in the float.

The basin cover 460 is then coupled to the basin base 462 by engaging the coupling elements 508 on the cover arms with the coupling rib or flange 540 on the outer surface of the collar upper part (see FIG. 17). The positioning of the cover arms 506 within the recesses 541 serves to align the cover to key the position of the feeding ports to be directly over the cutouts 606 as shown in FIG. 27. The bottleneck extension of the container is then screw threaded into the collar 522 to couple the container to the feeding basin.

Figure 28:
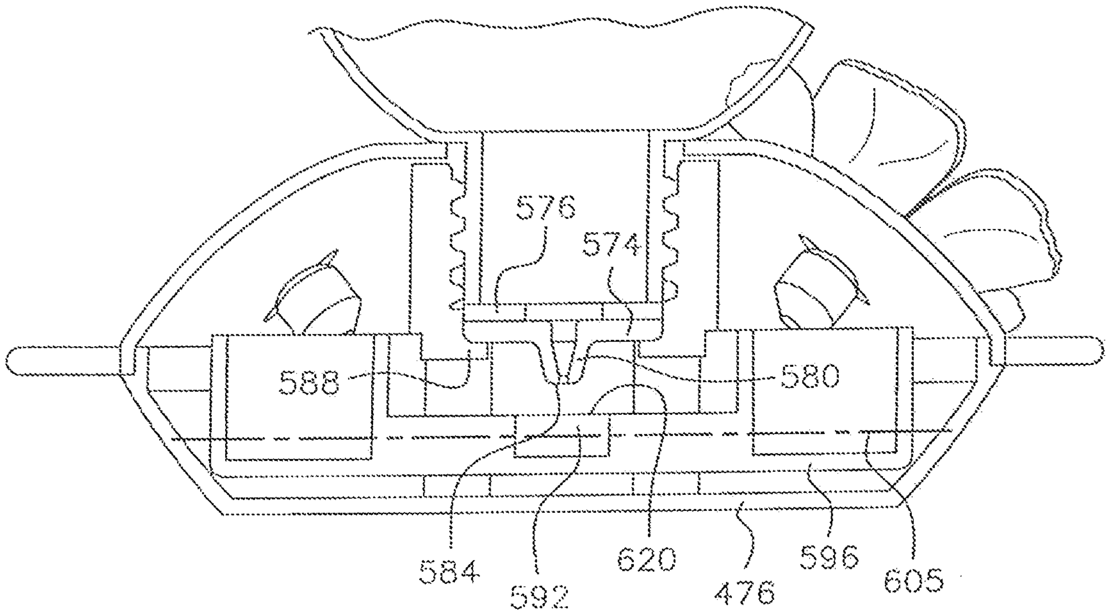
FIG. 28 is an enlarged sectional side view of the feeding basin, sealing mechanism and lower end of the liquid container of the feeder shown in FIG. 16, depicted in the open position.

Before the feeder is filled with nectar, or when the nectar level is low, the flat lower surface 596 of the float bottom part 594 rests on, or is near, the bottom 476 of the feeding basin base 462 in the lower position as shown in FIG. 28. In this lower position, the nozzle tip 584 of the bottle seal assembly 502 is spaced from the float seal, allowing nectar, when poured into the container, to flow into the feeding basin. As nectar flows into the feeding basin, the level of the nectar and, in turn, the vertical position of the float valve rises. When sufficient nectar has been received within the basin, the float valve 504, floating in the nectar, reaches its upper position at which point the feeding basin is "full".

Figure 29:
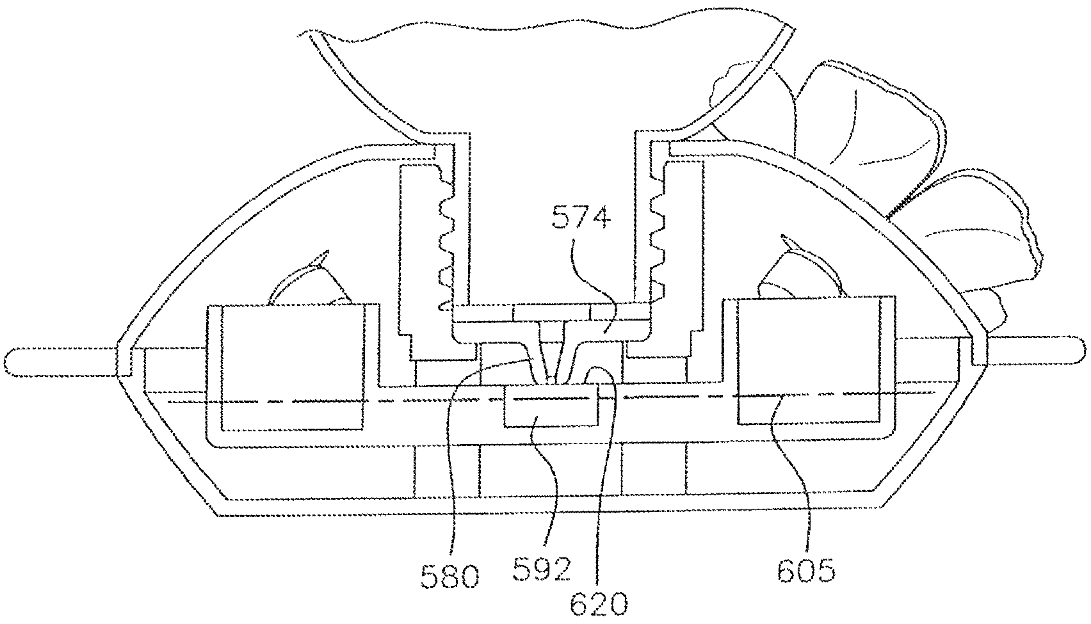
FIG. 29 is an enlarged sectional side view of the feeding basin, sealing mechanism and lower end of the liquid container of the feeder shown in FIG. 16, depicted in the closed position.

In the "full" position shown in FIG. 29, the float seal 592 comes into sealing engagement with the tip 584 of the nozzle 580. With the nozzle tip seated in the float seal, the float seal closes or plugs the central channel 582 in the nozzle member 526 to prevent further flow of nectar from the container into the feeding basin through the central channel.

In all five of the embodiments described herein, a float valve is used to control the amount of liquid nectar allowed to enter the feeding basin of the top-fill hummingbird feeder. By venting the cover or cap 50 of the container holding the liquid nectar in each embodiment, atmospheric pressure can be used to dispense the nectar when the float valve is open. When the feeding basin is full, the float in conjunction with the nectar level automatically prevents further filling of the feeding basin. As such, overflow of the basin in response to temperature-related expansion of the air in the container from night to day time periods is also prevented.

Figure 30:
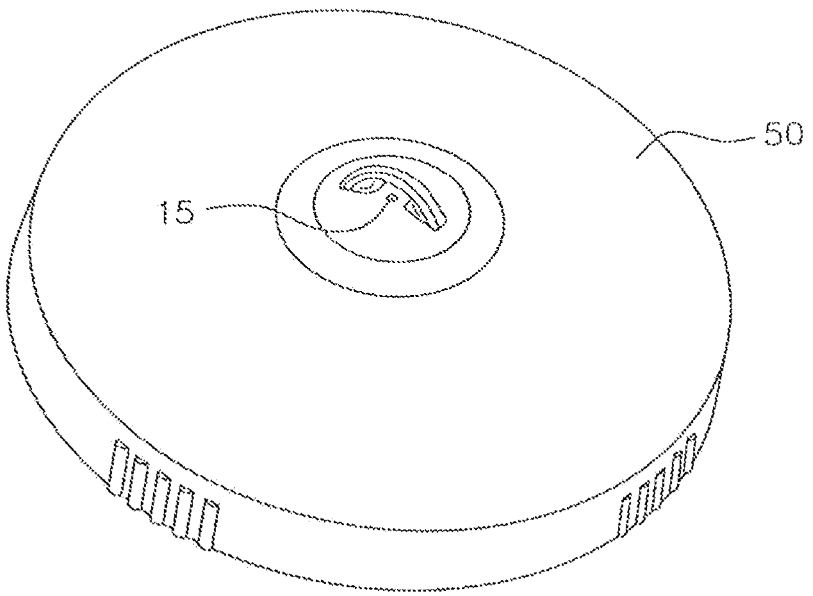
FIG. 30 is a perspective view of the container cap as shown in FIG. 1, with a vent hole formed therein.

A representative location of a vent 15 in the cap 50 is shown in FIG. 30. While the vent can be located anywhere in the cap, the location of the vent 15 under the support feature 11 used to hang the feeder, as shown in FIG. 30, is advantageous as the support feature 11 helps to minimize the entry of water and debris into the feeder which could potentially contaminate the nectar inside. A simple filter or screen could also be added to minimize entry of foreign matter such as dirt or insects through the vent hole. In an alternative vent style, grooves or cuts may be formed in the cap threads to allow venting through the cap threads so that a vent hole is not necessary.

Figure 31A:
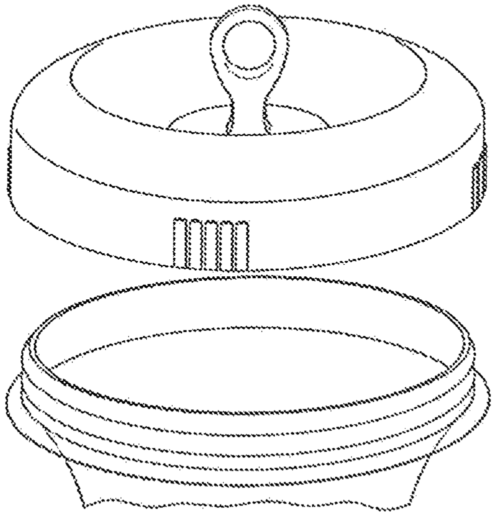
FIG. 31A is a perspective view of a second embodiment of the container cap, in which the vent hole is formed as part of a mounting structure used to hang the feeder.
Figure 31B:
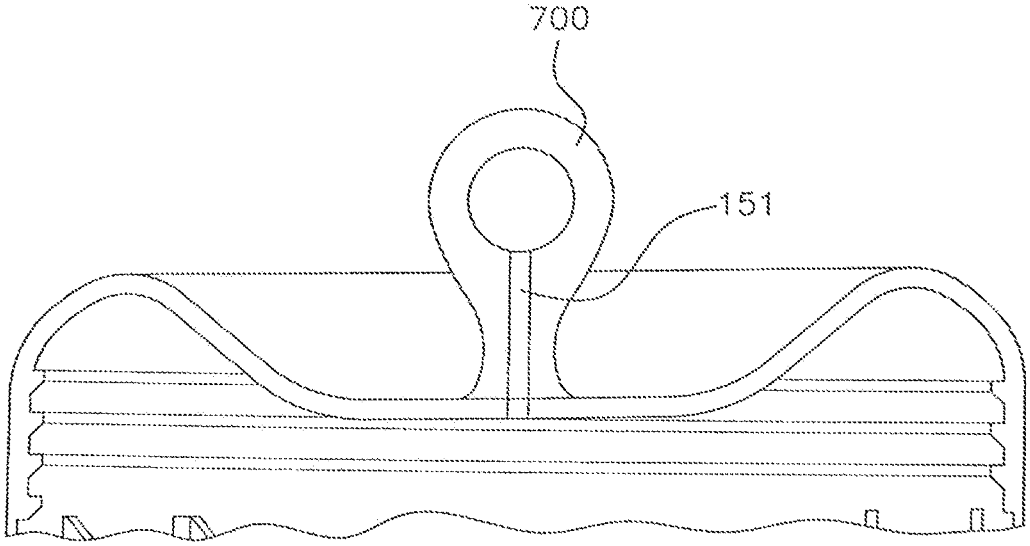
FIG. 31B is a sectional view of the container cap shown in FIG. 31A.
Figure 32A:
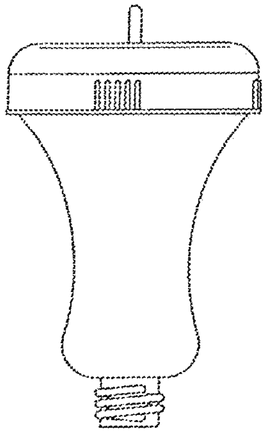
FIGS. 32A-32E are side views of various containers having different shapes that may be used in connection with any of the foregoing embodiments of the present invention.
Figure 32B:
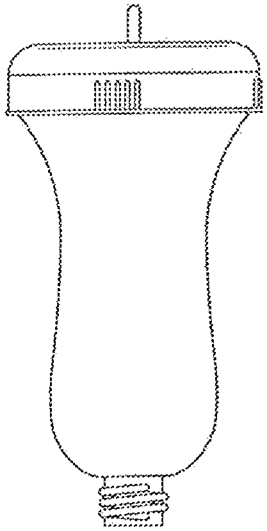
Figure 32C:
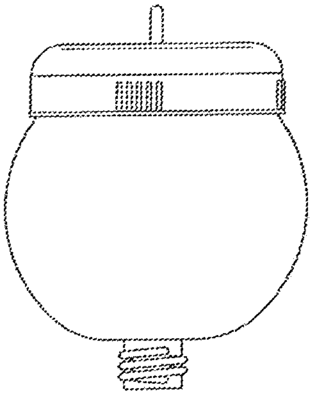
Figure 32D:
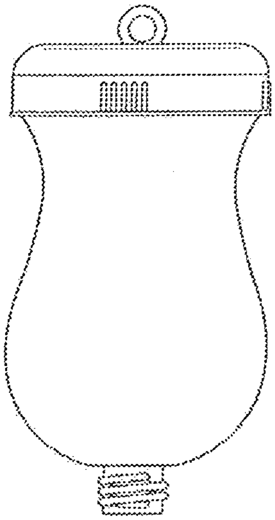
Figure 32E:
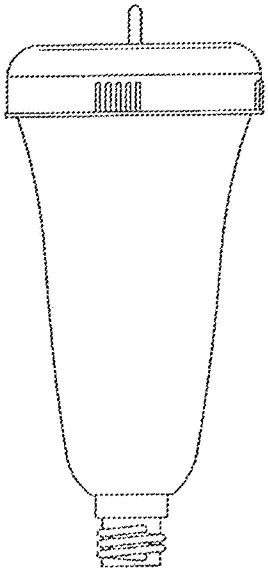
Figure 33A:
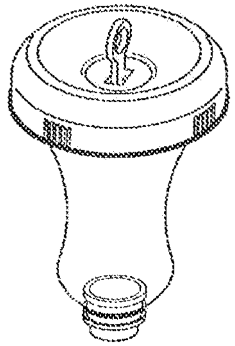
FIGS. 33A-33E are side perspective views of the containers shown in FIGS. 32A-32E, respectively.
Figure 33B:
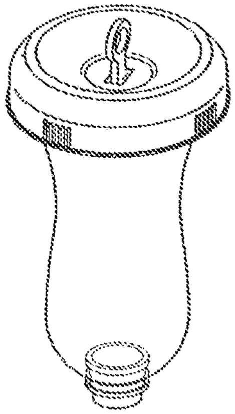
Figure 33C:
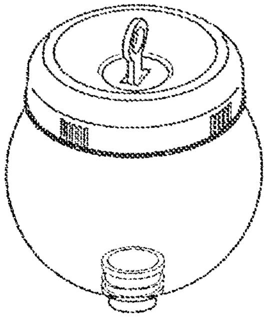
Figure 33D:
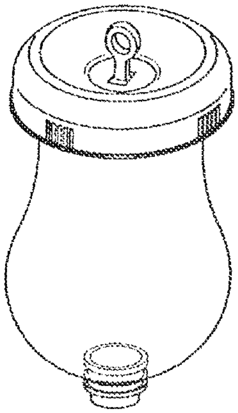
Figure 33E:
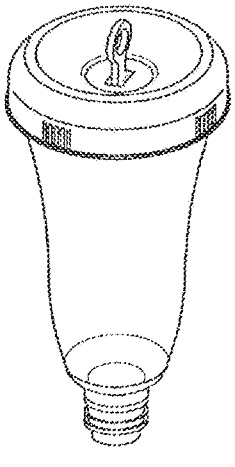

A second embodiment of a vented cap according to the present invention is shown in FIGS. 31A and 31B. In this embodiment, the vent hole 151 is formed as part of a mounting structure 700 used to hang the feeder.

All of the foregoing feeder embodiments support a wide array of container shapes; the only requirement is that the bottleneck extension is of a uniform size and configuration to be secured within the basin and/or basin-cooperating structures. Examples of possible container shapes are depicted in FIGS. 32A through 32E. These same shapes are shown in perspective view in FIGS. 33A through 33E. The present invention is not intended to be limited to these container shapes, however, as would be understood by persons of ordinary skill in the art.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A top-fill hummingbird feeder comprising:

a liquid container with a liquid opening at a lower end;

a feeding basin positioned below the liquid container for containing nectar accessed by birds;

a sealing mechanism including a float valve, a float and a plug, the float valve responsive to a nectar level in the feeding basin for opening and closing the liquid opening, the float valve selectively covering the liquid opening of the container, and being movable between a first position in which liquid is permitted to flow from the container and into the basin, and a second position in which liquid is prevented from flowing from the container into the basin, the float being movable in a vertical direction with the nectar level within the basin for biasing the plug into and out of the first position; and a collar coupled to the liquid container and to the feeding basin, the collar having a through channel in liquid communication with the liquid opening, the plug engaging with the through channel in the second position;

wherein the float has an open central area substantially bisected by a bridge structure and the collar includes a slot formed in a lower portion of the collar, the bridge structure aligning with the slot to capture the float and prevent rotation thereof when the collar is coupled to the feeding basin.

2. A top-fill hummingbird feeder comprising:

a liquid container with a liquid flow opening at a lower end;

a feeding basin positioned below the liquid container for containing liquid nectar accessed by birds through at least one feeding port, the liquid nectar having an upper surface; and a float valve including a float having an annular portion that is received within the feeding basin and positioned around the liquid flow opening, the annular portion being buoyant for floating upon the liquid nectar upper surface, the float having an open central area substantially bisected by a bridge structure and a sealing surface operative to close and open the liquid flow opening of the liquid container, as the float supported on the upper surface thereof, moves up and down, respectively, with a nectar level in the feeding basin.

3. The top-fill hummingbird feeder as set forth in claim 2, wherein the bridge structure includes two arms in linear alignment and separated by a center piece.

4. The top-fill hummingbird feeder as set forth in claim 2, further comprising a removable cap disposed on an upper end of the liquid container, the removable cap is vented.

5. The top-fill hummingbird feeder as set forth in claim 2, wherein the feeding basin includes a base and a removable cover.

6. The top-fill hummingbird feeder as set forth in claim 5, further comprising a bottle seal assembly engaging the float valve, the bottle seal assembly includes a bottle collar coupled to the liquid container, a bottle seal disposed in the bottle collar, and a nozzle member abutting the bottle seal.

7. The top-fill hummingbird feeder as set forth in claim 6, wherein the bottle collar has a pair of alignment recesses each having a coupling element, a pair of cover arms of the removable cover of the feeding basin are received in the alignment recesses and engage with the coupling elements of the bottle collar.

8. The top-fill hummingbird feeder as set forth in claim 6, wherein the base of the feeding basing has a guide structure engaging with the bottle collar and ensuring proper orientation of the bottle seal assembly and the float valve within the feeding basin.

9. The top-fill hummingbird feeder as set forth in claim 6, wherein the bottle seal is held between the liquid container and the nozzle member.

10. The top-fill hummingbird feeder as set forth in claim 6, wherein the nozzle member has a channel extending through the nozzle member with inwardly tapering walls.

11. The top-fill hummingbird feeder as set forth in claim 6, wherein the sealing surface is formed by a float seal held within the bridge structure, the float seal is formed of a different material than the bridge structure.

12. The top-fill hummingbird feeder as set forth in claim 11, wherein the bridge structure has a pair of arms joined by a center piece, the float seal is inset into a hollow area of the center piece.

13. The top-fill hummingbird feeder as set forth in claim 12, wherein the arms of the bridge structure are received within a slot of the bottle collar.

14. The top-fill hummingbird feeder as set forth in claim 2, wherein the float includes an inner wall defining a central area and an outer wall surrounding the inner wall, an open chamber is defined between the outer wall and the inner wall.

15. The top-fill hummingbird feeder as set forth in claim 14, wherein the outer wall has a plurality of spaced cutouts that align with the at least one feeding port of the feeding basin.

* * * * *